(12) United States Patent
Eun et al.

(10) Patent No.: US 8,423,781 B2
(45) Date of Patent: Apr. 16, 2013

(54) IMAGE FORMING APPARATUS, METHOD FOR VALIDATING IC CARD HOLDER, AND COMPUTER PROGRAM PRODUCT THEREOF

(75) Inventors: Jongsook Eun, Tokyo (JP); Takahiko Uno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 612 days.

(21) Appl. No.: 12/656,228

(22) Filed: Jan. 21, 2010

(65) Prior Publication Data
US 2010/0205449 A1  Aug. 12, 2010

(30) Foreign Application Priority Data
Feb. 12, 2009  (JP) ................................. 2009-030067

(51) Int. Cl.
*G06F 21/00*  (2006.01)

(52) U.S. Cl.
USPC .......................................... 713/182; 713/150

(58) Field of Classification Search .................. 713/150, 713/182–185
See application file for complete search history.

(56) References Cited

U.S. PATENT DOCUMENTS

| 5,267,315 | A | 11/1993 | Narita et al. | |
| 6,651,168 | B1 * | 11/2003 | Kao et al. | 713/185 |
| 2005/0223233 | A1 * | 10/2005 | Ishidera | 713/185 |
| 2008/0283592 | A1 * | 11/2008 | Oder II, et al. | 235/380 |
| 2009/0055925 | A1 * | 2/2009 | Masui | 726/20 |
| 2010/0077457 | A1 * | 3/2010 | Xu et al. | 726/4 |

FOREIGN PATENT DOCUMENTS

| JP | 2523197 | 5/1996 |
| JP | 2000-105788 | 4/2000 |
| JP | 2000-339273 | 12/2000 |
| JP | 2002-298097 | 10/2002 |
| JP | 2003-123032 | 4/2003 |
| JP | 2005-208963 | 8/2005 |
| JP | 2005-316570 | 11/2005 |
| JP | 3819172 | 6/2006 |
| JP | 2007-168187 | 7/2007 |
| JP | 4090680 | 3/2008 |

* cited by examiner

*Primary Examiner* — Kambiz Zand
*Assistant Examiner* — John B King
(74) *Attorney, Agent, or Firm* — Harness, Dickey & Pierce, P.L.C.

(57) ABSTRACT

A disclosed image forming apparatus includes a validating unit validating a holder of an IC card having a first security information set, login information set and first identifier information set, based on the first security information set; a login unit performing a login process for the IC card holder to log in based on the login information set; and a storage unit storing the first security information set as a second security information set and the first identifier information set as a second identifier information set obtained when the login process performed is successful. In the image forming apparatus, the validating unit validates, provided that first identifier information set from the IC card matches the second identifier information set in the storage unit, the holder of the IC card by reusing the second security information set in the storage unit when the first security information is requested using the IC card.

11 Claims, 20 Drawing Sheets

FIG.3

IC CARD (A)

CARD ID : 0845c021fc058c1a
PIN : 9999
NUMBER OF PIN INPUT FAILURES UNTIL THE
IC CARD IS LOCKED : 3
LOGIN USER ID : user001
LOGIN PASSWORD : password001
ELECTRONIC SIGNATURE :
*************************************
*************************************
*****

IC CARD (B)

CARD ID : 0123456789abcdef
PIN : 1111
NUMBER OF PIN INPUT FAILURES UNTIL THE
IC CARD IS LOCKED : 5
LOGIN USER ID : user002
LOGIN PASSWORD : password002
ELECTRONIC SIGNATURE :
*************************************
*************************************
*****

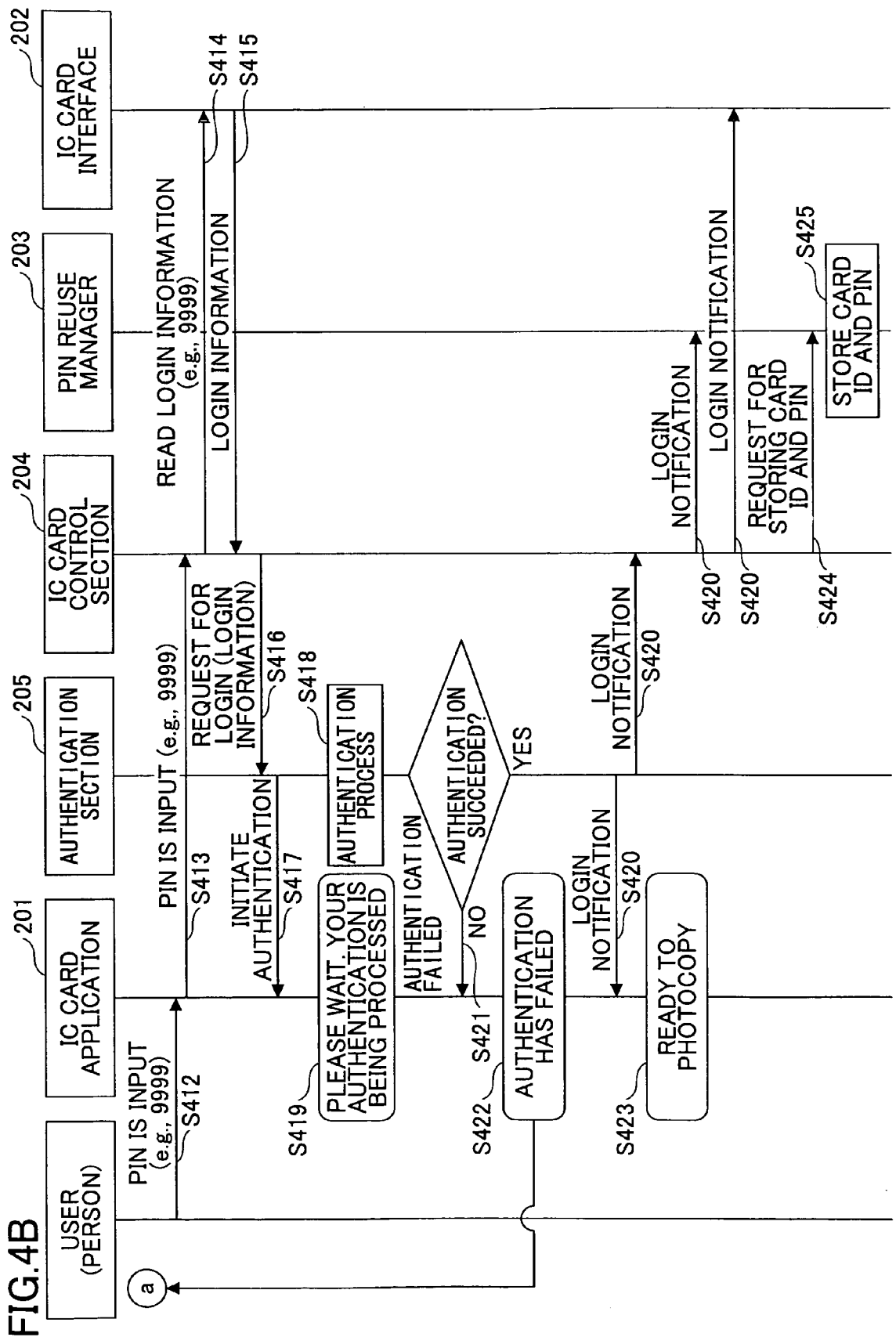

FIG.5

| CARD ID | PIN | NUMBER OF TIMES PIN IS REUSED (REMAINDER) | PRESCRIBED TIME |
|---|---|---|---|
| 0845c021fc058c1a | 9999 | 3 (TIMES) | 10 (MINUTES) |
| ... | ... | ... | ... |

FIG.7

| SETTING ITEMS | SETTING DETAILS | |
|---|---|---|
| 701 MANUAL PIN INPUT TIMING | MANUAL PIN INPUT ONLY ONCE | MANUAL PIN INPUT WHEN ELECTRONIC SIGNATURE IS REQUIRED |
| 702 STORED PIN DELETE TIMING | DELETE PIN AFTER PRESCRIBED NUMBER OF TIMES PIN HAS BEEN REUSED (e.g., 3 TIMES) | CONSTANT MANUAL PIN INPUT |
| | | DELETE PIN AFTER PRESCRIBED TIME (e.g., 10 MINUTES) |

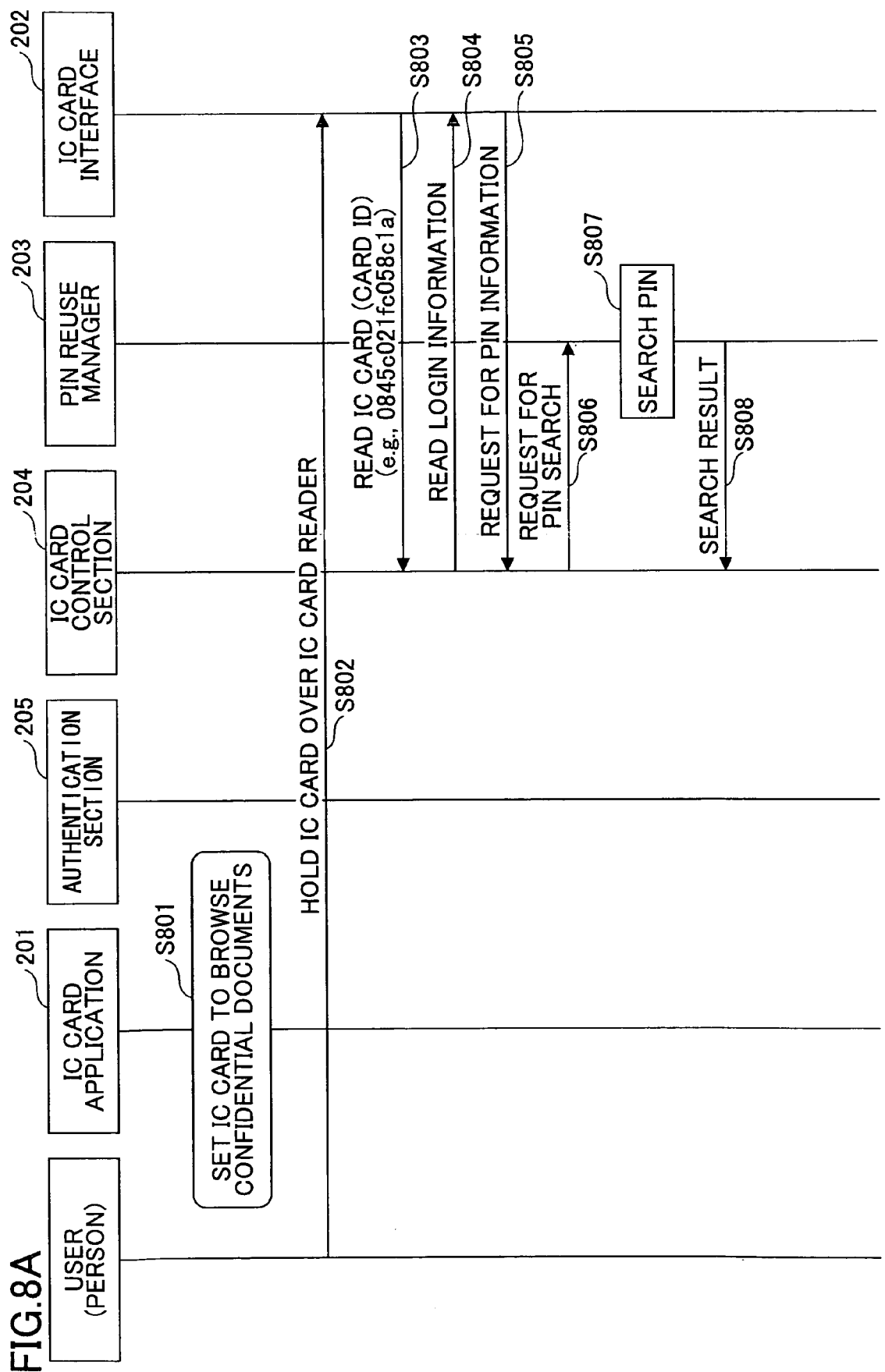

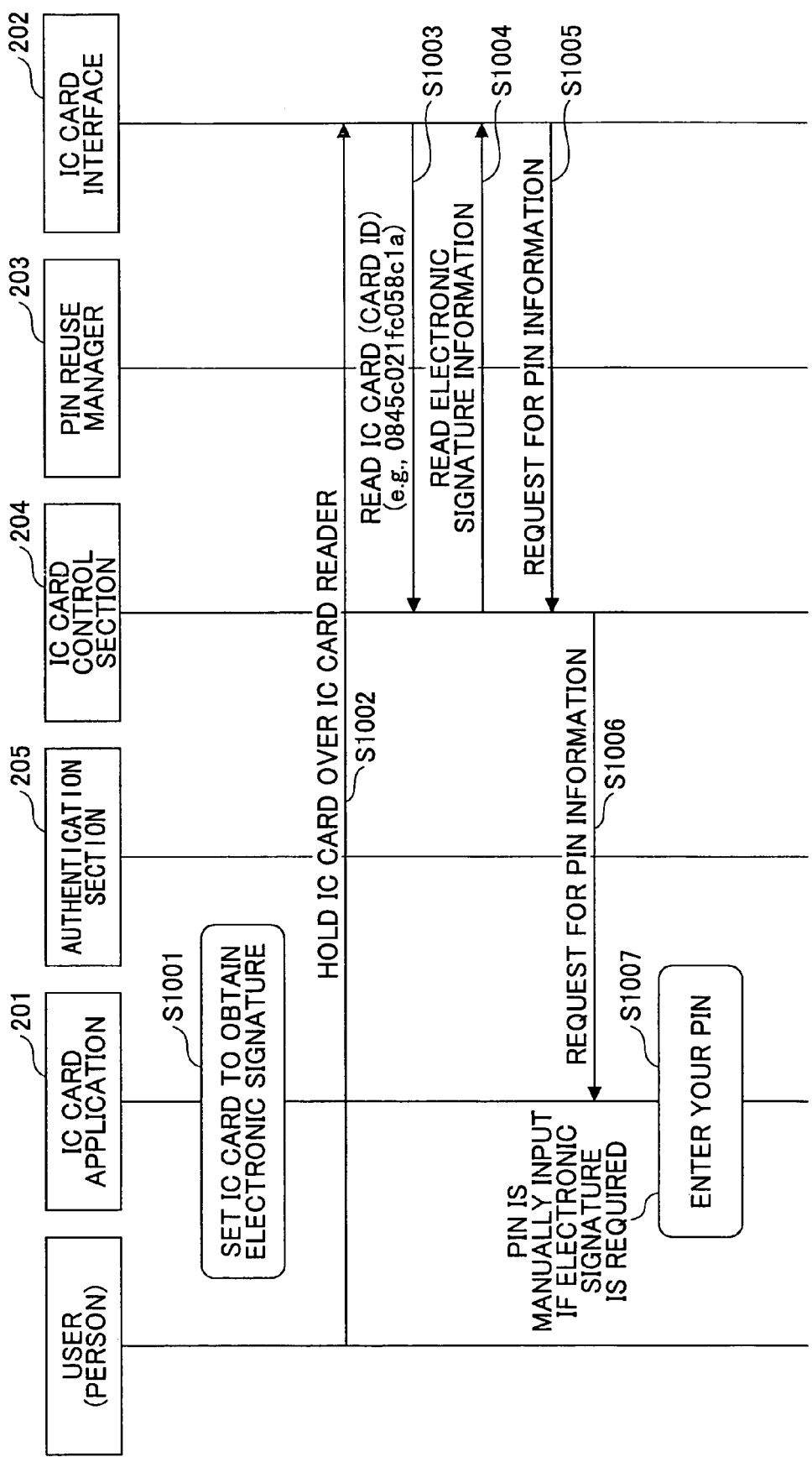

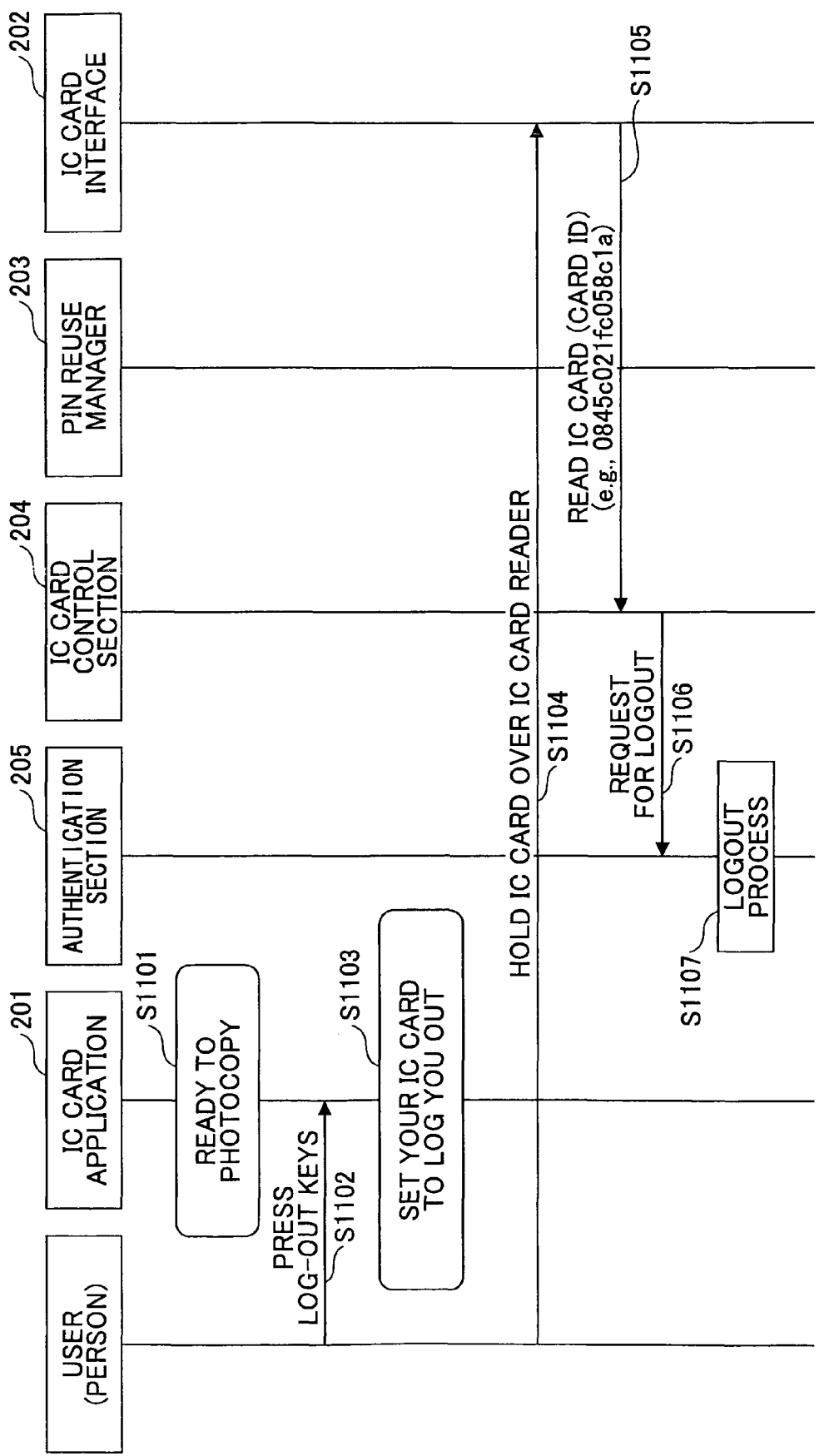

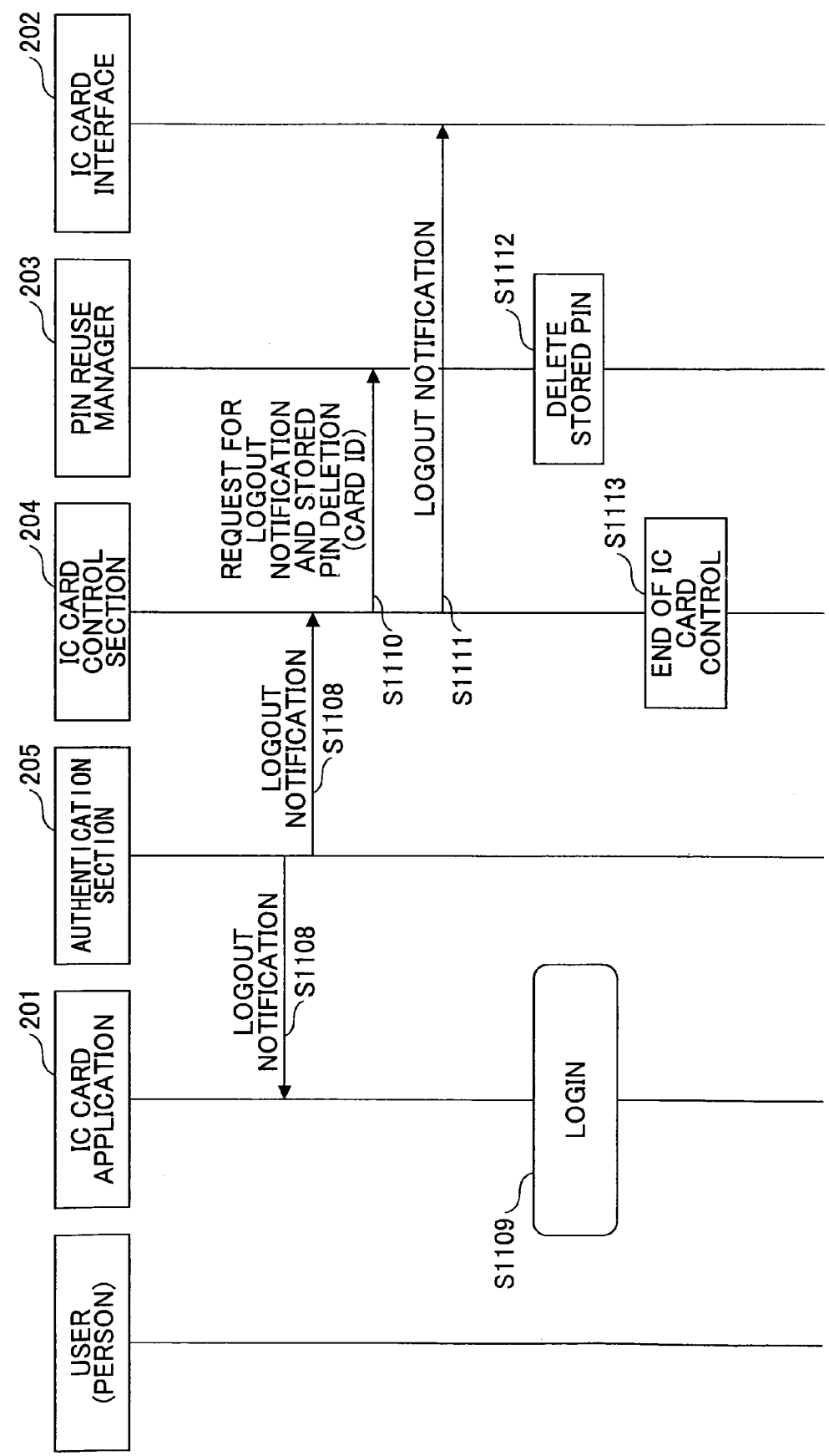

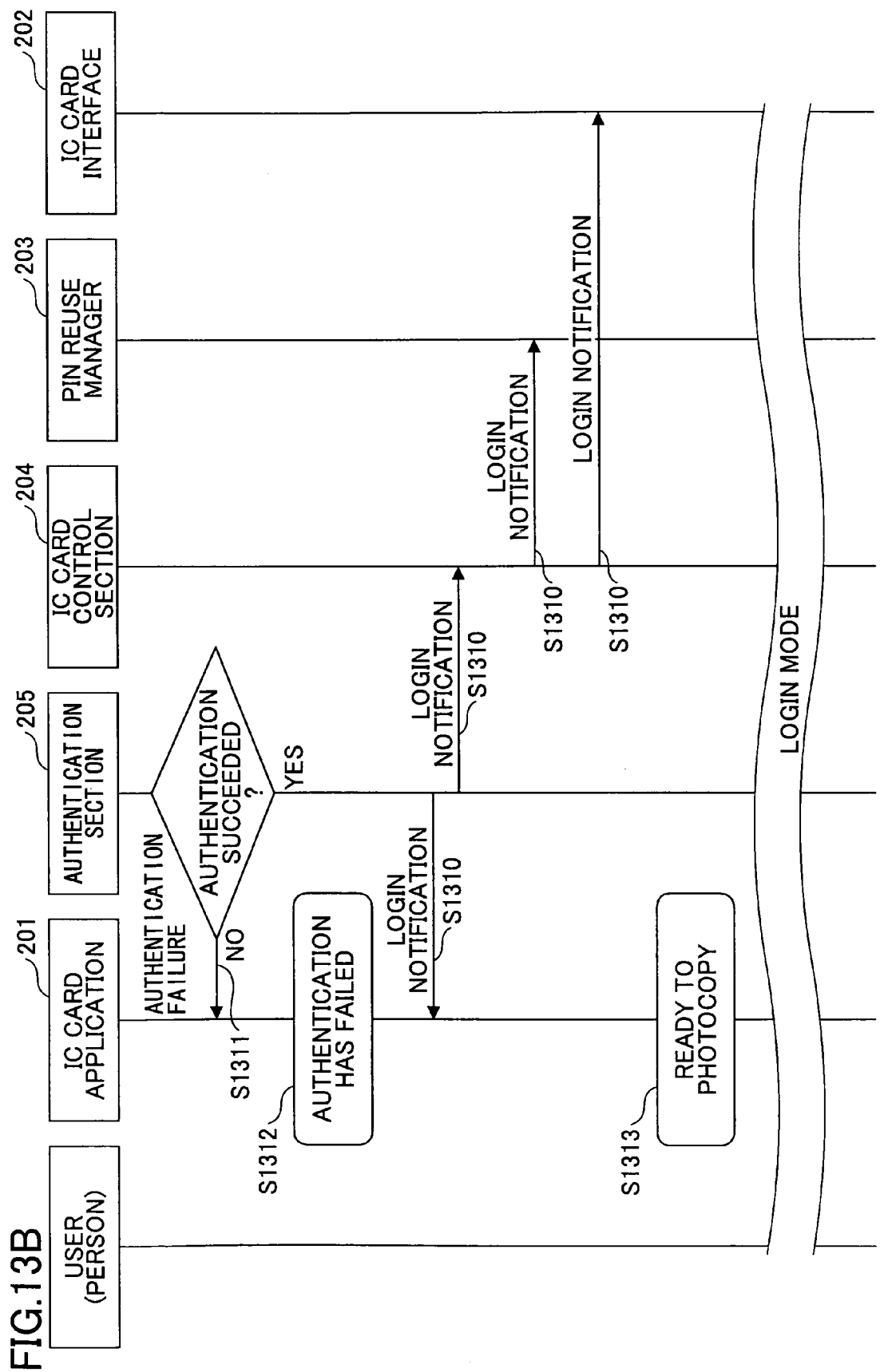

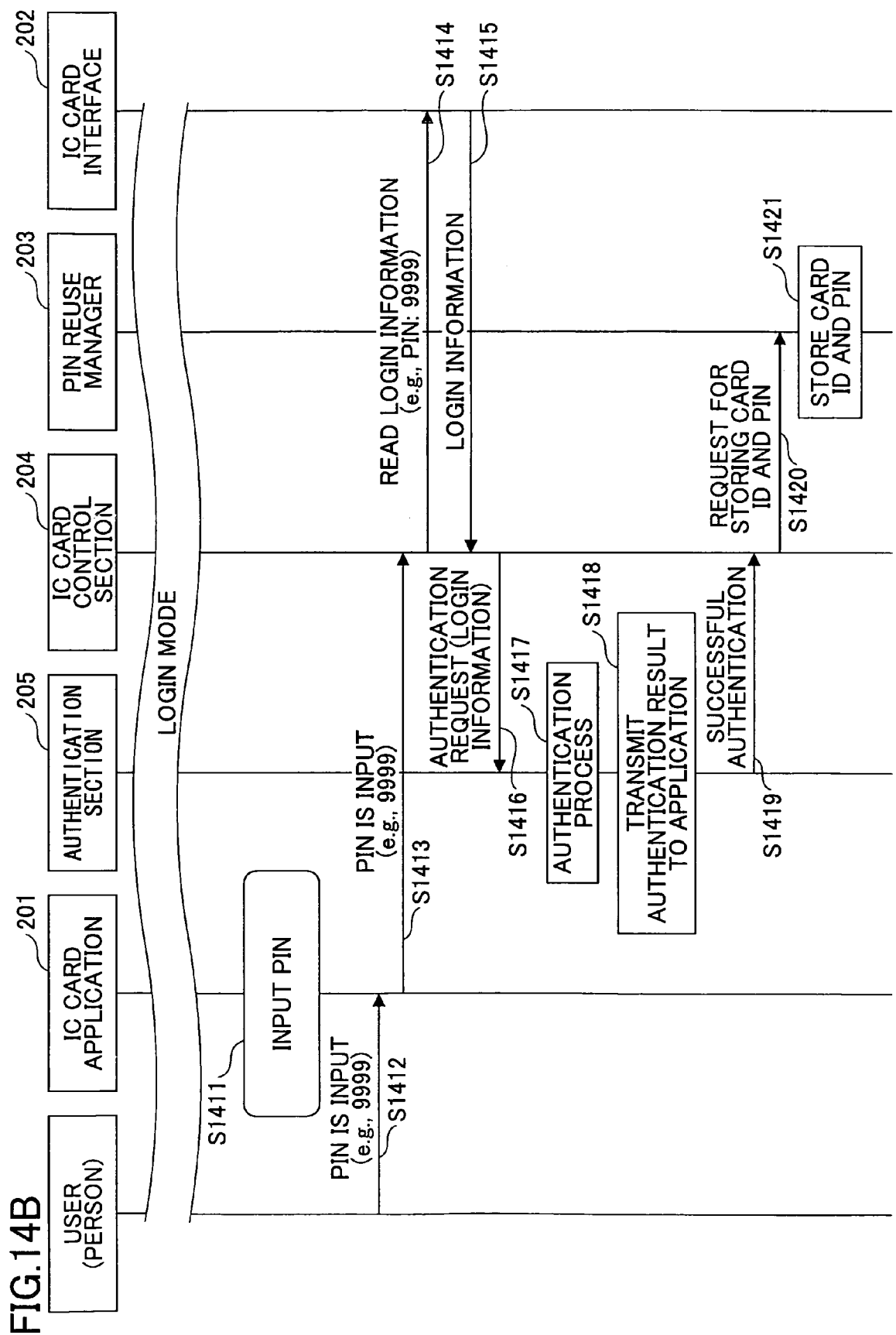

IMAGE FORMING APPARATUS, METHOD FOR VALIDATING IC CARD HOLDER, AND COMPUTER PROGRAM PRODUCT THEREOF

BACKGROUND OF THE INVENTION

1. Field of the Invention

The present invention generally relates to an image forming apparatus, a method for validating an IC card holder, and a computer program product for executing such a method.

2. Description of the Related Art

A recent image forming apparatus is known as a multifunctional model that incorporates various devices such as a facsimile machine, a printer, a copier, and a scanner in one enclosure. Such an image forming apparatus includes a display unit, a printer unit, and an imaging unit in one enclosure, and also includes four types of applications corresponding to the facsimile machine, printer, copier, and scanner to operate the functions by switching the applications. In this kind of multifunctional model of the image forming apparatus, a user may log in to the multifunctional machine with the user name and password and the multifunctional machine can control the user's accessibility to functions based on the user name and password.

Recently, an IC card has been widely used in various apparatuses and machines, so that an image forming apparatus is capable of reading the IC card including the user's identification information or electronic signature to identify the user and determining the user's accessibility to or access rights for various functions of the image forming apparatus.

Most IC cards having a function to authenticate a Personal Identification Number (PIN) can provide access to information stored in the IC card provided that PIN authentication succeeds. For example, when the user holds an IC card over the image forming apparatus to log into the image forming apparatus, the user inputs his or her PIN information so that the image forming apparatus reads the user's PIN information to verify it. With the successful authentication of the user's PIN information, the image forming apparatus acquires the user name and a corresponding password stored in the IC card to thereby carry out a login authentication. Accordingly, the image forming apparatus first requests the user or IC card holder to provide his or her PIN information so that the image forming apparatus can authenticate the IC card holder (Identity Authentication).

However, in some cases, the IC card holder or user may need to hold the IC card over the image forming apparatus again after the user has finished the login operation (i.e., in login mode). For example, when the user desires to use highly-confidential applications or applications that require the user's electronic signature, the user needs to hold the IC card over the image forming apparatus again to input the PIN information (security code) so that the image forming apparatus acquires information on the electronic signature stored in the IC card or re-authenticates the user or IC card holder. Accordingly, when an IC card holder, namely, the user desires to have access, using the IC card, to specific services that the image forming apparatus provides, the PIN authentication needs to be carried out for every service the user desires to have access to even if the user has logged in to the image forming apparatus. Authentication of the IC card holder is of importance in terms of security; however, it may involve cumbersome operations to be carried out by the user.

In the technical field of the present disclosure, Japanese Patent Application Laid-Open Publication No. 2003-123032 discloses an IC card terminal having an improved identity authentication technology in which a user or IC card holder simply supplies a common PIN to the IC card terminal to receive services therefrom for each of which the user normally needs to have a PIN authentication. This technology is devised to improve the usability of an IC card by attempting to eliminate cumbersome operations.

However, with the technology disclosed in Japanese Patent Application Laid-Open Publication No. 2003-123032, when the user desires to have access to specific services for each of which the user needs to have the identity authentication, the PIN authentication still has to be carried out for every service the user desires to have access to despite the fact that the user has already logged in to the terminal. For example, when the user desires to use highly-confidential applications or applications that require his or her electronic signature, the user needs to hold the IC card over the terminal again and then input the PIN information. Thus, even if the IC card holder or user has already logged in to the terminal or system by PIN authentication using the IC card, the user still has to hold the IC card over the terminal again to input the PIN information to have access to the specific services.

SUMMARY OF THE INVENTION

Embodiments of the present invention may provide a novel and useful image forming apparatus, method for validating an IC card holder, and computer program product for executing such a method solving one or more of the problems discussed above. More specifically, the embodiments of the present invention may provide an image forming apparatus, a method for validating an IC card holder, and a computer program product for executing such a method capable of exhibiting, based on an input policy of PIN information, improved usability and operability of an IC card that requires a PIN authentication with enhanced security.

An image forming apparatus according to an embodiment of the invention includes: a validating unit configured to validate a holder of an IC card having a first security information set, a login information set, and a first identifier information set corresponding to the first security information set, based on the first security information set; a login unit configured to perform a login process for the holder of the IC card to log in based on the login information set stored in the IC card; and a storage unit configured to store the first security information set of the IC card as a second security information set and the first identifier information set corresponding to the first security information set of the IC card as a second identifier information set that are obtained by the validating unit when the login process that is performed, after the holder of the IC card has been validated by the validating unit, by the login unit using the IC card is successful. In image forming apparatus according to the embodiment, the validating unit validates, provided that the first identifier information set obtained from the IC card matches the second identifier information set corresponding to the second security information set of the IC card stored in the storage unit, the holder of the IC card by reusing the second security information set corresponding to the second identifier information set of the IC card stored in the storage unit when the first security information is, after the login process has been performed, requested by using the IC card.

An image forming apparatus according to an embodiment of the invention includes: a validating unit configured to validate a holder of an IC card having a first security information set, a login information set and a first identifier information set corresponding to the first security information set, based on the first security information set; a login unit configured to perform a login process for the holder of the IC card to log in; and a storage unit configured to store the first security information set of the IC card as a second security information set and the first identifier information set corresponding to the first security information set of the IC card as a second identifier information set that are obtained by the validating unit when the holder of the IC card is, after the login process performed by the login unit using the IC card has been successful, validated by the validating unit. In the image forming apparatus according to the embodiment, the validating unit validates, provided that the first identifier information set obtained from the IC card matches the second identifier information set corresponding to the second security information set of the IC card stored in the storage unit, the holder of the IC card by reusing the second security information set corresponding to the second identifier information set of the IC card stored in the storage unit when the first security information is requested by using the IC card.

A computer-readable recording medium according to an embodiment of the invention includes a computer program for causing the image forming apparatus, which includes a validating unit configured to validate a holder of an IC card having a first security information set, a login information set, and a first identifier information set corresponding to the first security information set, based on the first security information set, and a login unit configured to perform a login process for the holder of the IC card to log in based on the login information set stored in the IC card, to execute a method for validating the holder of the IC card. The method includes storing the first security information set of the IC card as a second security information set and the first identifier information set corresponding to the first security information set of the IC card as a second identifier information set that are obtained by the validating unit when the login process that is performed, after the holder of the IC card has been validated by the validating unit, by the login unit using the IC card is successful; and validating, provided that the first identifier information set obtained from the IC card matches the second identifier information set corresponding to the second security information set of the IC card stored in the storage unit, the holder of the IC card by reusing the second security information set corresponding to the second identifier information set of the IC card in the storage unit when the first security information is, after the login process has been performed, requested by using the IC card.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

FIG. 3 is a diagram illustrating an example of data stored in an IC card;

FIGS. 4A and 4B are each a sequence diagram illustrating a login process using an IC card;

FIG. 5 is a diagram illustrating an example where a card ID and corresponding PIN information are stored;

FIG. 7 is a diagram illustrating an example of settings for a PIN reuse process;

FIGS. 8A and 8B are each a sequence diagram illustrating the PIN reuse process;

FIGS. 10A and 10B are each a sequence diagram illustrating a process without the reuse of the PIN;

FIGS. 11A and 11B are each a sequence diagram illustrating a logout process using an IC card;

FIGS. 13A and 13B are each a sequence diagram illustrating a manual logout process; and FIGS. 14A and 14B are each a sequence diagram illustrating a PIN storage process after a user has manually logged in.

DETAILED DESCRIPTION OF THE PREFERRED EMBODIMENTS

A description is given below, with reference to FIGS. 1 through 14A and 14B of embodiments of the present invention. The followings are descriptions of an image forming apparatus to which an embodiment of the invention is applied. An image forming apparatus according to an embodiment of the invention is a digital multi-functional peripheral (MFP) that includes plural functions such as those of a printer, a copier, and a scanner in one enclosure. With advancement of digital imaging technology and MFP technology, recent MFPs include a wide variety of security functions so that users use the security functions in various ways in their corresponding environments.

<Outline>

In an image forming apparatus having a login function to identify an IC card, a user first holds a user's IC card (hereinafter also simply referred to as an "IC card") over an IC card reader 18 as a user login operation. If this IC card requires PIN authentication and the user is prompted to enter his or her PIN (e.g., security code), the user enters the PIN upon request. When the PIN authentication is successful, the user ID and password stored in the IC card that are required for the user to have access to functions of the image forming apparatus are read by the IC card reader to log the user in to the image forming apparatus. If the user successfully logs in, the user has access to the functions of the image forming apparatus.

Hereinafter, a case is described where the user needs to hold the IC card over the IC card reader again even if the user has logged in to the image forming apparatus. Such a case includes when the user desires to use highly-confidential applications or applications that require information stored in the IC card such as the user's electronic signature. In this case, the user needs to hold the IC card over the IC card reader again based on an IC card presentation request from the application. The user subsequently enters his or her PIN based on the PIN input request.

However, since the user has already logged in to the image forming apparatus by holding his or her IC card over the IC card reader to enter his or her PIN, repeating the same input operation is a cumbersome process for the user.

In view of this cumbersome operation, the image forming apparatus according to the present embodiment is configured such that the repeated operation of logout or reentry of PIN may be omitted under a certain restriction provided that the user has succeeded once in the PIN authentication and login authentication by holding his or her IC card over the IC card reader. That is, the image forming apparatus according to the present embodiment is configured to exhibit improved usability and operability of the IC card with enhanced security based upon PIN information input policy when the user uses the IC card that requires the PIN authentication. Further details of the image forming apparatus according to the embodiment are described below.

<Configuration>
(Hardware)

Figure 1:
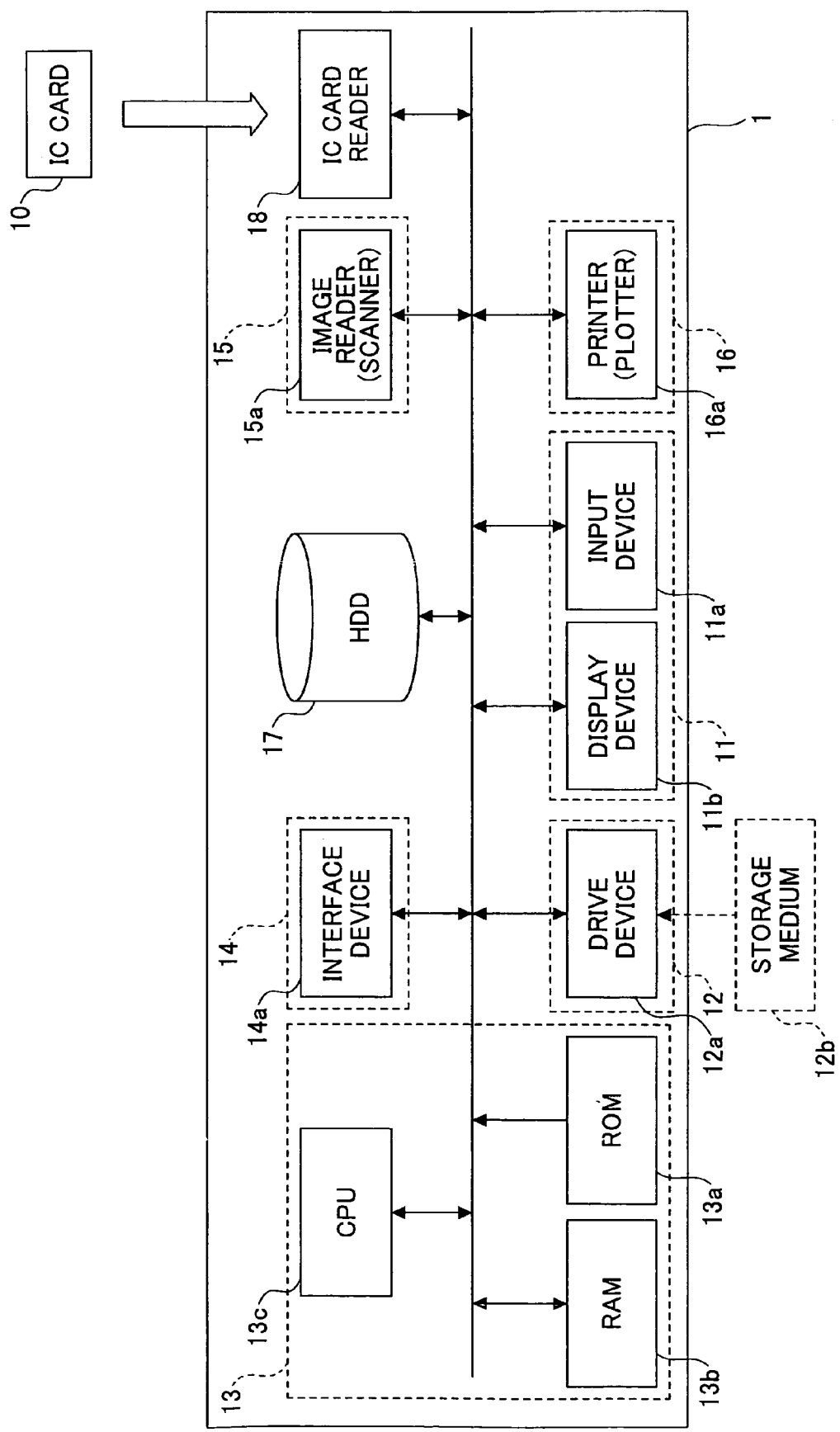
FIG. 1 is a diagram illustrating a hardware configuration example of an image forming apparatus according to an embodiment of the invention.

FIG. 1 is a diagram illustrating a hardware configuration example of an image forming apparatus 1 according to the embodiment of the invention. The image forming apparatus 1 according to the embodiment includes an operations panel 11, a storage medium IF 12, a controller 13, a data communication IF 14, a scanner 15, a plotter 16, a hard disk drive (HDD) 17, and an IC card reader 18 that are mutually connected to one another.

The operations panel 11 includes an input device 11a and a display 11b. The input device 11a is composed of a keyboard (hardware) via which various operational signals are supplied to the image forming apparatus 1. The display device 11b is composed of a display on which various types of information about image forming operations are displayed. The data communication IF 14 includes an interface device 14a via which the image forming apparatus 1 is connected to a data transmission line such as a network. The HDD 17 stores data such as received document data to be processed in the image forming apparatus 1 or machine readable image data. The HDD 17 manages such data with a prescribed file system or database (DB).

These data stored in the HDD 17 include authentication data for users' authentications. Such data to be stored in the HDD 17 may be provided with a recording medium 12b such as a memory card or uploaded via the network that is the data transmission line. The recording medium 12b is placed in a drive device 12a in the storage medium IF 12 so that data on the recording medium 12b are installed on the HDD 17.

The controller 13 includes a read only memory or ROM 13a, a random access memory or RAM 13b, and a central processing unit or CPU 13c. The ROM 13a stores programs and data to be executed at startup of the image forming apparatus 1. The RAM 13b temporarily holds programs and data retrieved from the ROM 13a or HDD 17. The CPU 13c executes the programs temporarily held by the RAM 13b. The controller 13 executes, on receiving printing data via the data communication IF 14, a program or PDL parser capable of interpreting a page description language (PDL) retrieved from the ROM 13a and loaded in the RAM 13b to interpret the received printing data, thereby generating a bitmap image.

The scanner 15 includes an image reader 15a to optically read a document placed on a document reading surface, thereby generating image data. The plotter 16 includes a printer 16a to print the bitmap image data on recording paper with an electrophotographic process system.

The IC card reader 18, over which the card holder or user holds his or her IC card 10, reads information recorded on the IC card 10 such as login information (i.e., user name and password) and an electronic signature.

As described above, the image forming apparatus 1 according to the embodiment can implement functions such as those of a copier, a printer, facsimile machine, a scanner, and the like. In addition, in this image forming apparatus, the user may log out by holding his or her IC card 10 over the IC card reader 18.

(Functionality)

Figure 2:
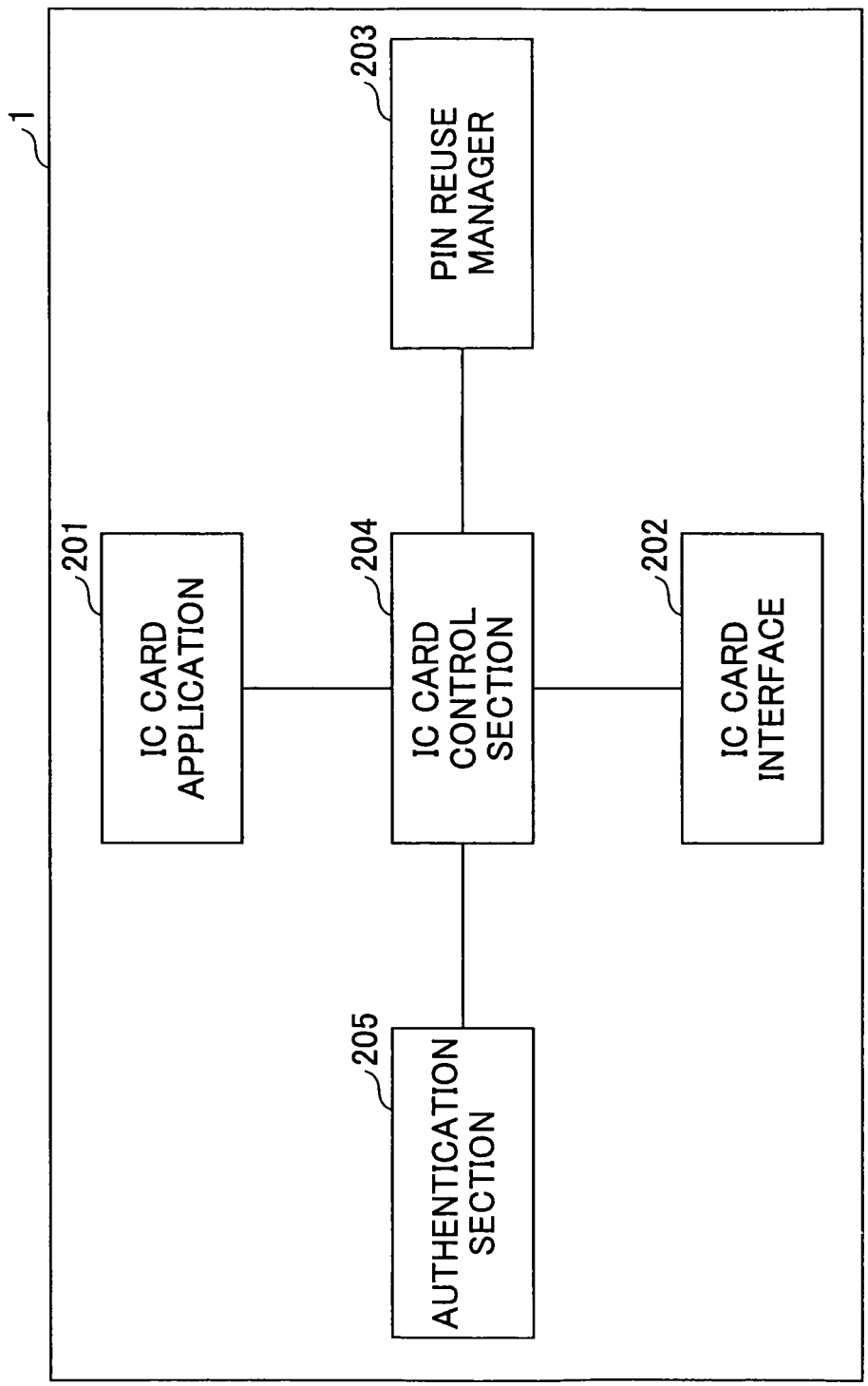
FIG. 2 is a functional block diagram illustrating a major functional configuration of the image forming apparatus according to the embodiment of the invention.

FIG. 2 is a functional block diagram illustrating a major functional configuration of the image forming apparatus according to the embodiment of the invention. The Image Forming apparatus 1 includes an IC card application 201, an IC card interface 202, a PIN reuse manager 203, an IC card control section 204, and an authentication section 205.

The IC card application 201 mainly functions as an interface between the user and the IC card 10.

The IC card interface 202 functions as an interface between the IC card 10 and the IC card application 201.

The PIN reuse manager 203 functions to manage storage and deletion of PIN information, and search for requested PIN information and other types of PIN reuse processes.

The IC card control section 204 controls operations involving IC card handling. For example, the IC card control section 204 acquires information contained in the IC card 10 via the IC card interface 202. The IC card control section 204 also requests the PIN reuse manager 203 to store or search for the PIN information.

The authentication section 205 determines whether to allow each user to have access to the image forming apparatus 1 by carrying out a user authentication based on a user ID and password combination. The authentication section 205 may alternatively restrict each user's access to functions of the image forming apparatus 1 by determining the user's access rights based on the user ID.

The functions of the PIN reuse manager 203 are actually implemented by the programs executed by the CPU 13c of a computer, namely, the image forming apparatus 1. Note that the functions may not be provided in the image forming apparatus 1 and may alternatively be provided in an external apparatus connected over the network. For example, the authentication section 205 may be formed externally as an authentication device.

(IC Card Data)

Next, data stored in the IC card 10 are described, prior to descriptions of operations of the image forming apparatus 1 according to the embodiment. FIG. 3 is a diagram illustrating an example of data stored in the IC card 10. FIG. 3 illustrates examples as an IC card (A) and IC card (B). Information on a "card ID" functions as an identifier that uniquely identifies an IC card. Information on "PIN" functions as security information to validate the IC card holder. Information on the "number of PIN input failures until the IC card is locked" indicates information on the number of times the user must sequentially fail in the PIN authentication to disable the IC card. Information on "login user ID" and "login password" indicate information on the user ID and password combination with which the user can have access to functions of the image forming apparatus 1. Information on an "electronic signature" is required for specific applications of the image forming apparatus 1, and used for the user to have access to highly-confidential documents or to produce highly-confidential documents. Other types of, data or information may also be stored in the IC card 10 in addition to those described above.

Note that the "IC card" information can be obtained without the "PIN authentication" whereas the "login user ID" and "login password", and "electronic signature" information are obtained with a successful "PIN authentication". The types of information that are important to security are configured not to be obtained without the successful "PIN authentication".

<Operation>

Next, operations of the image forming apparatus 1 according to the embodiment of the invention are described. The operations of the image forming apparatus 1 according to the embodiment are described in the order of a flow of operations (1) a login process, (2) a PIN storage process, (3) a PIN reuse process, (4) a logout process, and (5) a PIN delete process.

(1) Login Process

A user can log in to the image forming apparatus using the IC card 10. The user first holds his or her IC card 10 over the IC card reader 18 to log in to the image forming apparatus 1 (login operation). On detection of the IC card 10 by the IC card reader 18, the image forming apparatus 1 displays a request for input of PIN information to the user. When the user inputs the PIN information, the image forming apparatus 1 notifies the IC card 10 of the input PIN information via the IC card reader. The IC card 10 compares the PIN information stored in the IC card 10 with the notified PIN information. The IC card 10 transmits information on a user ID and password combination to the image forming apparatus 1 if the PIN information stored in the IC card 10 matches the notified PIN information. The image forming apparatus 1 transmits the user ID and password combination obtained from the IC card 10 to the authentication section 205 and requests a login authentication. The authentication section 205 compares the user ID and password combination transmitted from the IC card 10 with a user ID and password combination stored in the DB, and enables, if the login authentication is successful, the user to have access to functions of the image forming apparatus 1. In addition, the authentication section 205 restricts the user's access to some of the functions by determining the user's access rights based on the user's ID.

Figure 4A:
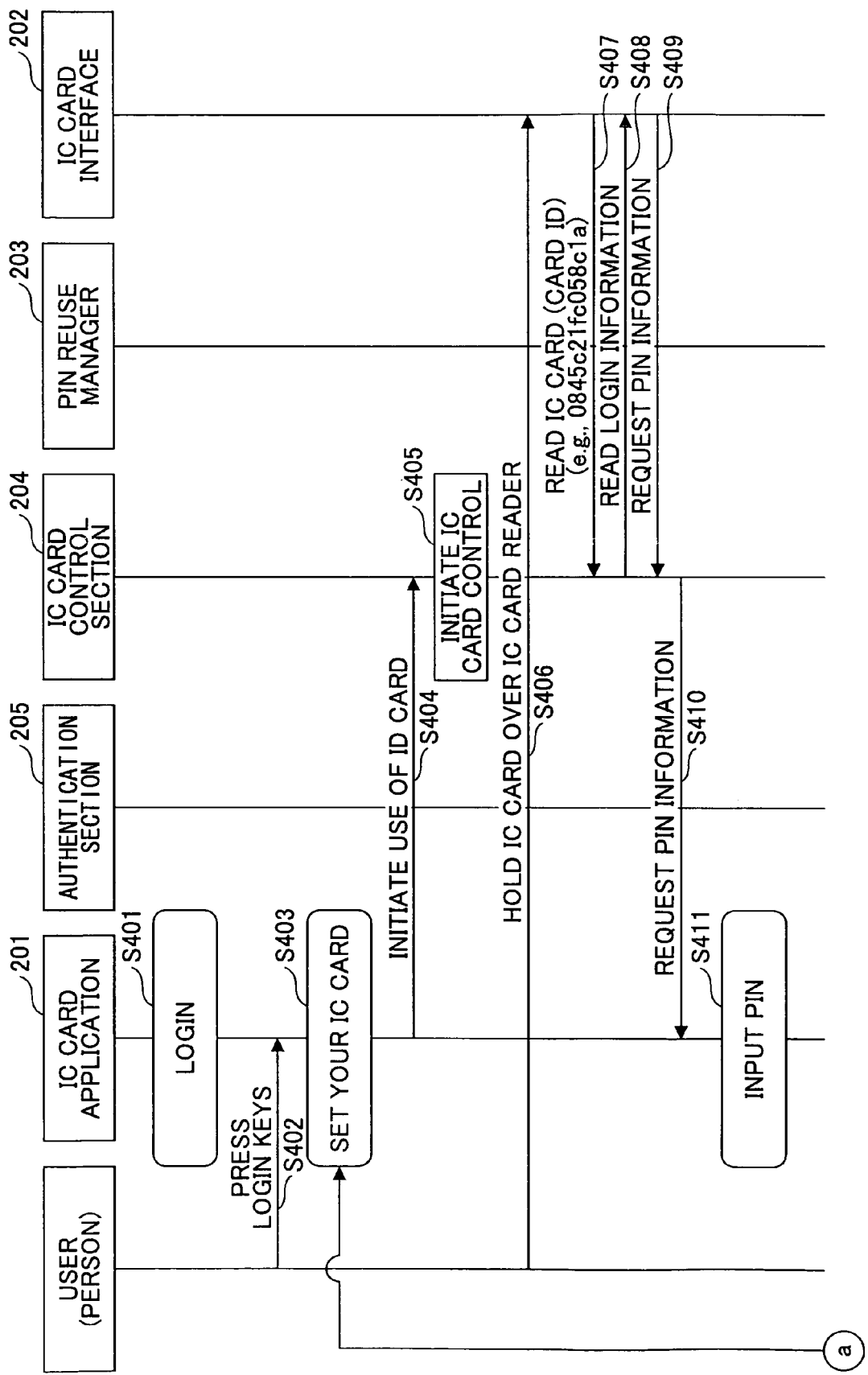

FIGS. 4A and 4B are each a sequence diagram illustrating a login process using an IC card. The login process is described with reference to FIGS. 4A and 4B.

The IC card application 201 displays a login prompt on the display device 11b such as "Log in to the image forming apparatus 1" (S401). The user is in a login standby mode.

When the user touches or presses a login key (S 402) via a touch panel of the operations panel 11 or a keyboard (input device 11a), the IC card application 201 displays an IC card setting prompt to the user (S403). For example, the IC card application 201 displays the IC card setting prompt on the display device 11b such as "Set your IC card". The IC card application 201 also notifies the IC card control section 204 of initiation of use of the IC card (S404) in order for the IC card control section 204 to initiate controlling functions related to the IC card 10 (S405).

When the user holds the IC card 10 over the IC card reader 18 (S406), the IC card interface 202 detects the IC card 10 and retrieves the card ID from the IC card 10 (S407) to transmit the card ID to the IC card control section 204. In this example, "0845c021f058c1a" is retrieved as the card ID.

The IC card control section 204 reads login information (i.e., user ID and password combination) from the IC card 10 via the IC card interface 202 (S408). Note that the login information indicates any information related to the login. That is, the login information not only includes the user ID and password combination but also includes any information on the IC card eventually related to the login use. For example, the IC card control section 204 reads a staff number stored in the IC card to eventually obtain the user ID and password combination relating to the staff number so as to use the obtained user ID and password combination for the login authentication. The login information stored in the IC card may thus be any information eventually used for the login authentication.

Note that the PIN authentication is required to have access to the login information. Referring back to FIGS. 4A and 4B, if the login information is read from the IC card 10 (S408), the IC card interface 202 requests the PIN (security information) necessary for the PIN authentication (S409).

When the PIN request is transmitted to the IC card application 201 (S410), the IC card application 201 displays a PIN input request prompt on the display device 11b (S411). For example, the IC card application 201 displays the PIN input request prompt on the display device 11b such as "Input your PIN".

When the user inputs his or her PIN such as "9999" (S412), the input PIN information is transmitted to the IC card control section 204 (S413). The IC card control section 204 reads the login information (i.e., user ID and password combination) from the IC card 10 again based on the received PIN information (S414).

Since the IC card interface 202 receives the effective PIN, the IC card interface 202 transmits the login information obtained from the IC card 10 to the IC card control section 204 (S415). The IC card control section 204 requests the authentication section 205 to allow the user to log in to the image forming apparatus 1 based on the obtained login information (S416).

The authentication section 205 transmits information on the initiation of the login authentication to the IC card application 201 (S417) to initiate the login authentication process (S418). The login authentication process is performed based on whether the user ID and password combination from the IC card matches the user ID and password combination already stored in the DB. In the login authentication process, the IC card application 201 displays, for example, "Please wait. Your authentication is being processed". (Step S419).

The authentication section 205 authorizes the user to log in to the image forming apparatus 1 if the login authentication is successful, and transmits a login notification to the IC card application 201 and the IC card control section 204 (S420). The login notification is transmitted to the PIN reuse manager 203 and the IC card interface 202 via the IC card control section 204. The successful login authentication is communicated to the user by displaying a message on the display device 11b such as "Ready to photocopy" (S423). If the login authentication has failed (S421), the user is notified of the login failure by displaying a message such as "Login has failed" (S419).

The IC card control section 204 receives the login notification (S420) and requests the PIN reuse manager 203 to store the card ID and PIN (S424). On receiving the request, the PIN reuse manager 203 stores the card ID and PIN (S425).

FIG. 5 is a diagram illustrating an example where a card ID and corresponding PIN information are stored. As described above, the information on the card ID and the corresponding PIN combination obtained from the IC card 10 is stored during the login operation. The stored PIN is reused in a later described PIN authentication. Note that in this embodiment, the PIN reuse manager 203 includes a function to save or store the card IC and PIN information (i.e., storage device). In FIG. 5, the "number of times a PIN may be reused (remainder)" indicates the number of possible times the PIN may be reused, whereas the "prescribed time" indicates a period of time in which the PIN may be reused, details of which are described later.

(2) PIN Storage Process

Figure 6:
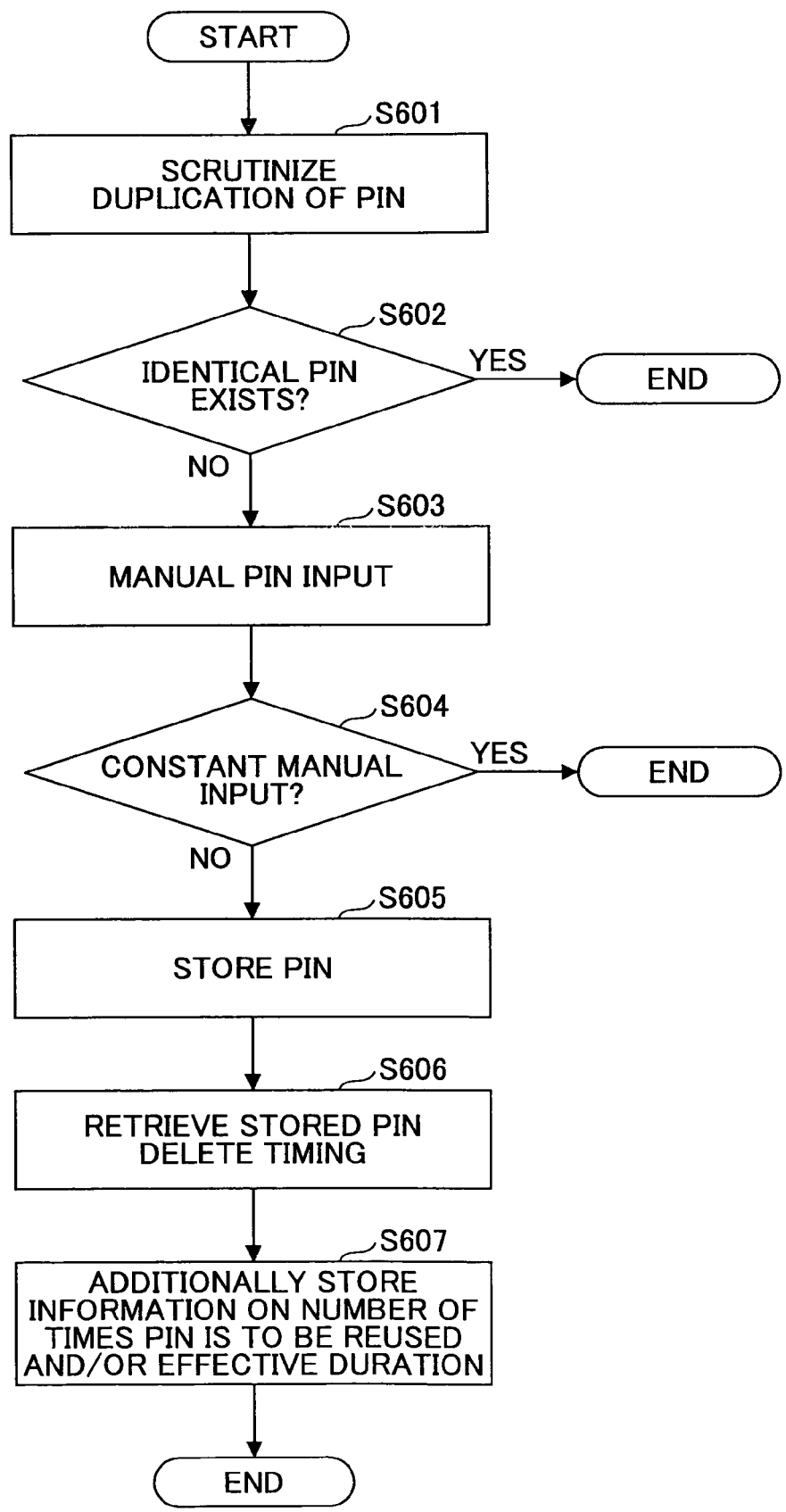
FIG. 6 is a flowchart illustrating a PIN storage process.

The process of storing the PIN (S425) is described in more detail. FIG. 6 is a flowchart illustrating a PIN storage process. The PIN storage process is described with reference to FIG. 6.

First, prior to storing the PIN, whether a duplicate PIN exists is determined (S601). That is, it is determined whether a PIN identical to the PIN corresponding to the card ID is already stored. If the PIN identical to that corresponding to the card ID (S602) is already stored, the PIN corresponding to the card ID does not need to be stored, thereby ending the PIN storage process (END). If there is no duplication of the PIN, a setting of "manual PIN input timing" is retrieved (S603).

FIG. 7 is a diagram illustrating an example of settings for reuse of the PIN. The details of settings are configured in advance by an administrator based on a security policy. In FIG. 7, the "manual PIN input timing" 701 is one of the setting items for reuse of the PIN and used for setting the timing at which the user manually inputs the PIN (i.e., the user holds the IC card over the IC card reader). Further details of the setting are described below.

If the "manual PIN input timing" 701 is set as a "constant manual PIN input", the user has to input the PIN manually every time the user logs in to or attempts to have access to the specific applications. That is, this model indicates a related art use model of the IC card. In this case, since the PIN is input every time the user logs in or the like, it is not necessary for the PIN to be stored.

If the "manual PIN input timing" 701 is set as a "manual PIN input only once", the user manually inputs the PIN once in the initial login operation and is not required to input the PIN again until the stored PIN is deleted (e.g., until a logout operation is performed). That is, if the user succeeds once in the PIN authentication in the initial login operation, the user does not need to manually input the PIN again in accessing the subsequent specified applications. In this case, the PIN needs to be stored in order to reuse the PIN.

If the "manual PIN input timing" 701 is set as a "manual PIN input when an electronic signature is required", the user manually inputs the PIN once in the initial login operation and is not, in principle, required to input the PIN again until a logout operation is performed. However, if the electronic signature is to be obtained from the IC card 10, the user is required to manually input the PIN again for the PIN authentication. In this case, the PIN needs to be stored in order to reuse the PIN. Accordingly, the manual PIN input may be set especially for preventing an operation having some risk of masquerade attacks. Note that in this embodiment, a case where the PIN manual input is set when the "electronic signature" is required is only an example, and the PIN manual input may also be set for other cases such as when highly-confidential documents are browsed or some specific applications are accessed. That is, the administrator is capable of individually setting the manual PIN input timing 701 by determining when the PIN manual input is required or when the PIN can be reused based on the security policy. Accordingly, the manual PIN input timing 701 in FIG. 6 may be variously set based on the settings determined by the administrator.

Referring back to S604 of FIG. 6, if the "manual PIN input timing" 701 is set as the "constant manual PIN input", the PIN does not need to be stored, thereby ending the PIN storage process. If the "manual PIN input timing 701" is not set as the "constant manual PIN input", the PIN is stored with the corresponding card ID as illustrated in FIG. 5 (S605).

Next, in the step of storing the PIN (PIN storage timing), a setting of "stored PIN deleting timing" 702 in FIG. 7 is retrieved. The number of times the PIN may be reused (remainder) and the prescribed time (effective duration) are stored together with the PIN information based on the setting of the "stored PIN deleting timing" 702 (S607).

The "stored PIN deleting timing" 702 is one of the setting items related to reuse of the PIN and is configured to set the timing at which the stored PIN is deleted. Specifically, as a setting for the timing at which the stored PIN is to be deleted, "after the prescribed number of times the PIN has been (re) used", or "after the prescribed time has elapsed" may be given. In a case where the PIN is to be deleted when the PIN has been reused the prescribed number of times, the stored PIN is deleted from the storage device when the number of times the PIN has been reused may exceed the prescribed number of times the PIN is to be reused (e.g., three times) that is set for the "prescribed times" as illustrated in FIG. 5. In a case where the PIN is to be deleted when the prescribed time has elapsed, the stored PIN is deleted from the storage device when the prescribed time is reached (e.g., 10 minutes) that is set for the "prescribed time" as illustrated in FIG. 5. Note that the "number of times the PIN may be reused (remainder)" and the "prescribed time" may be set individually or in combination.

(3) PIN Reuse Process

Figure 8B:
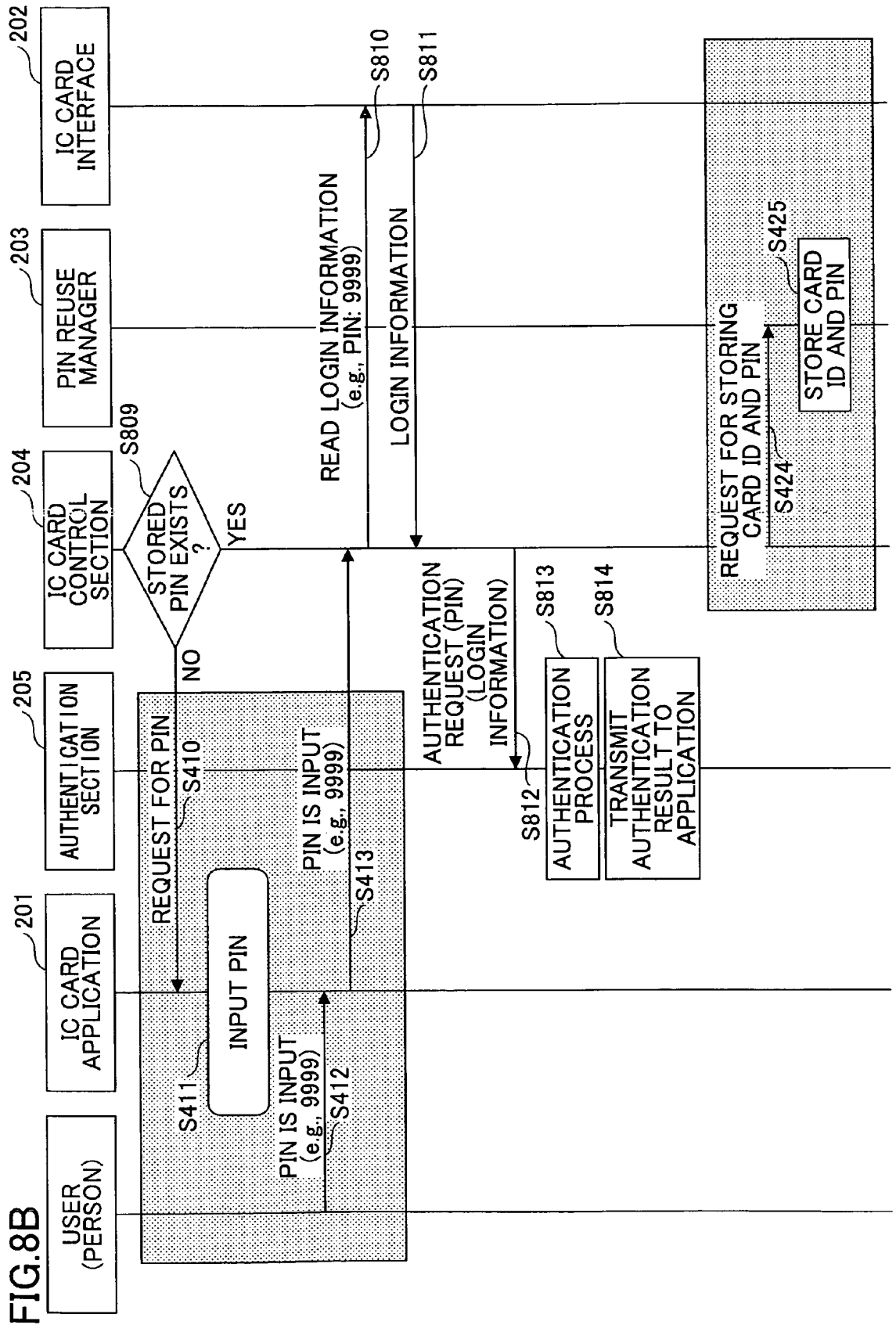

The user can have access to the image forming apparatus 1 by using the login process described above. While the user is in a login mode and desires to have access to the applications that require the validation of the IC card holder (e.g., highly-confidential applications), the user needs to hold the IC card 10 over the IC card reader 8 based on an IC card presentation request from the application and manually input the PIN based on the subsequent PIN input request. However, in the PIN reuse process according to this embodiment, the user may not have to reenter the PIN due to reuse (retrieval) of the stored PIN described above, thereby eliminating the cumbersome operation. FIGS. 8A and 8B are each a sequence diagram illustrating the PIN reuse process.

In the following descriptions of the PIN reuse process with reference to FIGS. 8A and 8B, the operations of the IC card control section 204 and PIN reuse manager 203 are performed provided that the "manual PIN input timing 701 in FIG. 7 is set as the "manual PIN input only once". Further, the operations of the IC card control section 204 and PIN reuse manager 203 are performed provided that the PIN stored in the initial login operation is not deleted due to the fact that the number of times the PIN has been reused may exceed the prescribed number of times or the duration the PIN has been stored exceeds the prescribed time. Accordingly, if the user manually inputs the PIN once during the initial login operation, the user is not required to input the PIN again in accessing the specified application until the stored PIN is deleted (e.g., until the logout operation is performed). The PIN reuse process is described with reference to FIGS. 8A and 8B.

While the user is still in the login mode and desires to have access to the application that requires the validation of the IC card holder, the application displays a message to the user via the IC card application 201 to prompt the user to set an IC card (S801). For example, the IC card application 201 displays the IC card setting prompt on the display device 11b such as "Set your IC card to browse confidential documents".

When the user holds the IC card 10 over the IC card reader 18 (S802), the IC card interface 202 detects the IC card 10 and retrieves the card ID from the IC card 10 (S803) to transmit the card ID to the IC card control section 204. Since the IC card used in this example is the same IC card used in the aforementioned login operation, "0845c021f058c1a" is retrieved as the card ID.

The IC card control section 204 reads the login information from the IC card 10 via the IC card interface 202 (S804). Since the PIN authentication is required to have access to the login information, the IC card interface 202 requests the PIN (security information) necessary for the PIN authentication (S805).

When the PIN request is transmitted to the IC card control section 204, the IC card control section 204 transmits a PIN search request to the PIN reuse manager 203 (S806). The PIN reuse manager 203 searches for the PIN corresponding to the card ID based on information on the card ID as a search key (S807). Thereafter, the PIN reuse manager 203 transmits a search result to the IC card control section 204 as a response to the search request (S808). The details of the search result include existence of an identical PIN, and, if the identical pin is found, the information on the found identical PIN. Since the PIN "9999" corresponding to the card ID "0845c021fc058c1a" is stored (see FIG. 5), the PIN reuse manager 203 transmits the PIN "9999" as the search result to the IC card control section 204 as a response to the search request.

In addition, the PIN reuse manager 203 decrements, if the identical PIN is found, the count for the "number of times the PIN may be reused (remainder)" by one (−1). Further, the PIN reuse manager 203 deletes the PIN information if the count of the "number of times the PIN may be reused (remainder)" is "0". This stored PIN deleting process is described later.

Figure 9:
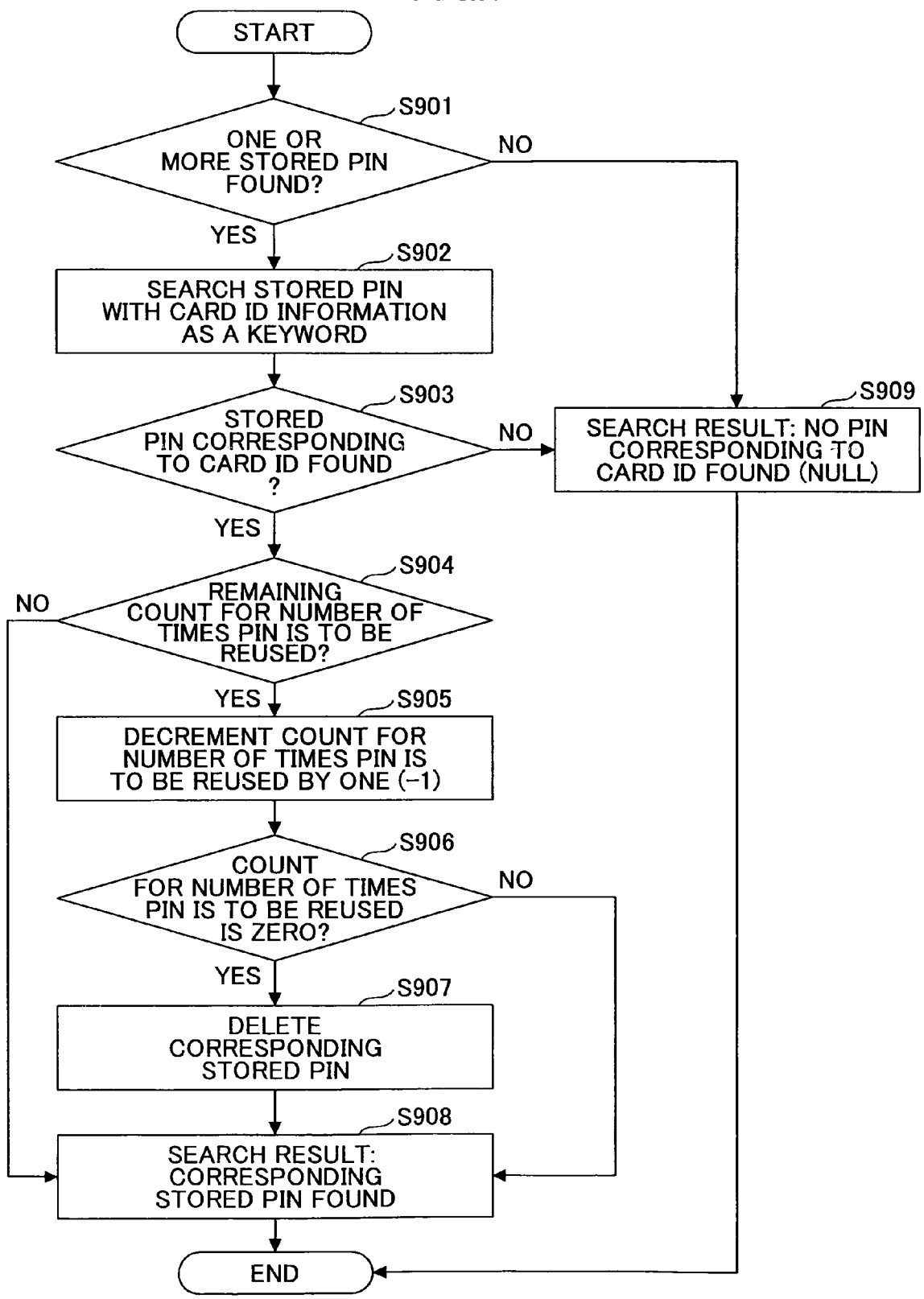
FIG. 9 is a flowchart illustrating a PIN search process.

FIG. 9 is a flowchart illustrating a PIN storage process. The PIN storage process is briefly described below. First, the PIN reuse manager 203 determines whether there is one or more stored PINs (S901). If there are no stored PINs, "No corresponding PIN is found" is communicated as the search result (S909). Next, if YES in S901, the PIN reuse manager 203 searches through the stored PINs with the card ID information as a key (S902). The PIN reuse manager 203 determines whether there is a stored PIN corresponding to the card ID information among the stored PINs (S903). If there is a stored PIN corresponding to the card ID information, the PIN reuse manager 203 determines whether there is a remaining count (value) for the "number of times the PIN may be reused (remainder)" (S904). This step is provided for determining whether the "stored PIN deleting timing" 702 is set as "after the prescribed number of times the PIN has been reused". If there is a remaining count (value) for the number of times the PIN may be reused (remainder), the count for the number of times the PIN may be reused (remainder) is decremented by one (S905). Thereafter, the PIN reuse manager 203 determines whether the count for the number of times the PIN may be reused (remainder) is zero (S906). If the count for the number of times the PIN may be reused (remainder) is zero (YES in S906), indicating that the PIN has been reused the prescribed number of times for the PIN is to be reused, the PIN reuse manager 203 deletes the stored PIN (S907). This stored PIN deleting process is described later. In this case, the PIN reuse manager 203 determines that there is a PIN corresponding to the card ID as the search result (S908).

Referring back to FIGS. 8A and 8B, if there is a stored PIN corresponding to the card ID (S809), the IC card control section 204 reads the login information from the IC card based on the stored (retrieved) PIN information (S810). This indicates PIN reuse.

Since the IC card interface 202 receives the effective PIN, the IC card interface 202 transmits the login information obtained from the IC card 10 to the IC card control section 204 (S811). The IC card control section 204 requests the authentication section 205 to allow the user to login based on the obtained login information (S812).

The authentication section 205 authenticates the user to login (S813), and transmits the authentication result to the application that has required the validation of the IC card 10 (S814). If the authentication result is successful, the user can browse the highly-confidential documents as a service provided by the application. Note that in the image forming apparatus 1 according to the embodiment, in order for the user to have access to highly-confidential documents, the method for authenticating the IC card or IC cardholder carried out by the authentication section 205 is only an example. However, alternatively, the image forming apparatus 1 according to the embodiment may be configured such that the application that requires the validation of the IC card 10 includes an authentication function to authenticate the IC card 10 based on the login information.

So far, the PIN reuse process is described. Accordingly, in the reuse PIN process according to the embodiment, the user may not have to reenter the PIN by reusing (retrieving) the stored PIN described above instead of manually inputting the PIN again, thereby eliminating the cumbersome operation.

(A Case where No Stored PIN is Found)

In FIGS. 8A and 8B, if there is no stored PIN corresponding to the card ID information found as a result of the PIN search (S807), steps S410 through S413, S424, and S425 (shaded portions) are carried out. The details of the steps are the same as those illustrated in FIGS. 4A and 4B, and the descriptions thereof are thus omitted. Here, supplemental explanation is provided for the case where no stored PIN corresponding to the card ID information is found. The case where no stored PIN corresponding to the card ID information is found includes a case where the count for the number of times the PIN may be reused (remainder) is zero as illustrated in FIG. 5, so that the stored PIN information is deleted; or a case where the prescribed time has elapsed as illustrated in FIG. 6 (S610), so that the stored PIN information is deleted. In these cases, despite the fact that PIN has been stored once in a storage device, stored PIN information is deleted when a predetermined condition for the storage device is satisfied. As a result, the corresponding stored PIN information may not be found. Moreover, the case where no stored PIN is found also includes a case where the user sets a wrong IC card differing from the IC card used in the initial login operation (S802). Naturally, the wrong IC card includes information differing from that of the IC card used in the login operation. As a result, the corresponding stored PIN information may not be found. That is, the wrong IC card is used for the first time.

In the above cases, the PIN needs to be (re)entered (S410 through S413). Further, if the user enters the PIN for the wrong IC card, the user may be prompted to log in. This is because the user having the wrong IC card is a different login user. The IC card control section 204 requests the PIN reuse manager 203 to store the corresponding card ID and the obtained PIN (S424), and the PIN reuse manager 203 stores the corresponding card ID and the obtained PIN (S425). Thereafter, the stored PIN can be reused under a prescribed condition. If there is already a stored PIN corresponding to the card ID information (S809), the steps S424 and S425 are not carried out.

(Case where the PIN is not Reused)

Figure 10B:
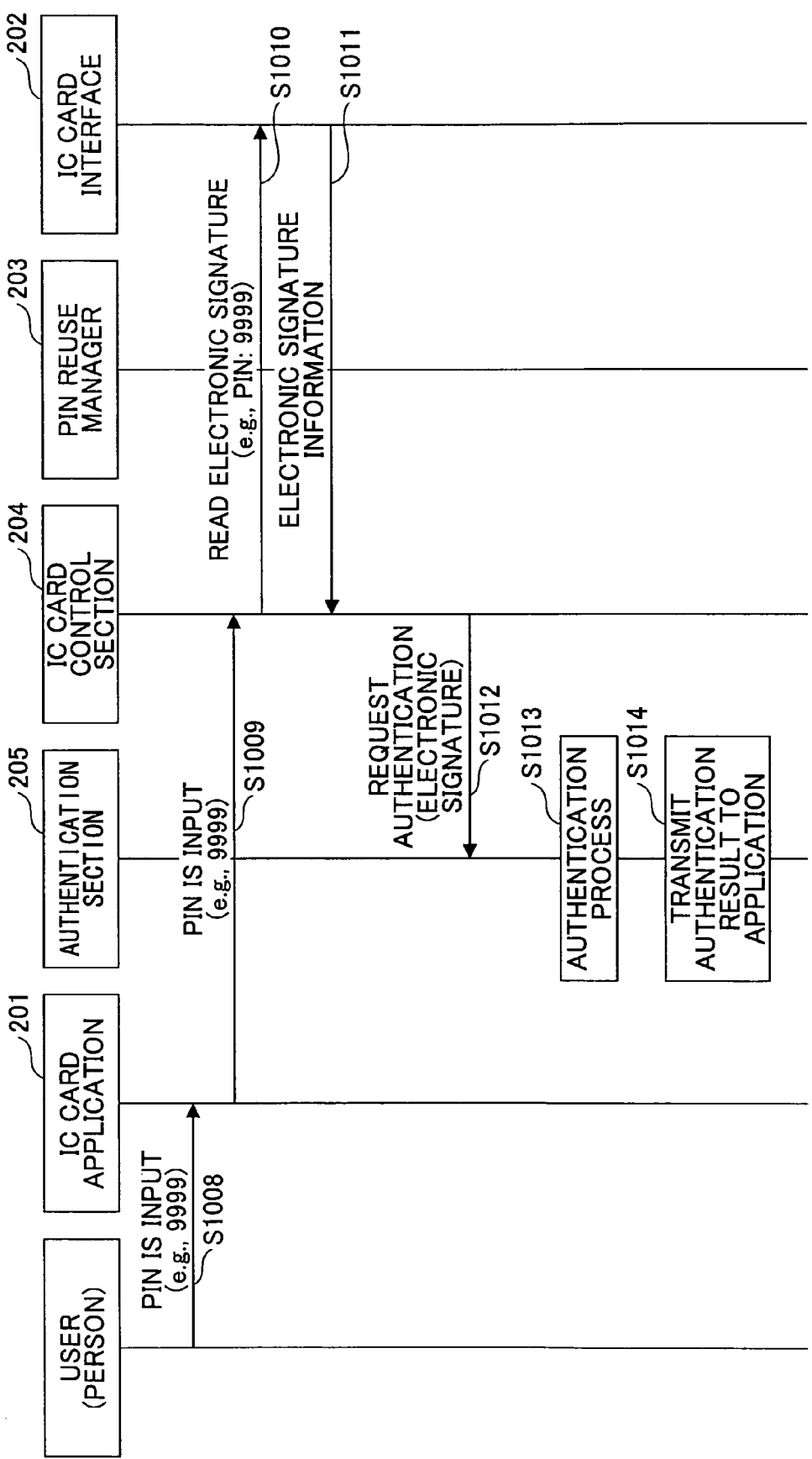

Hereafter, a case where the PIN is not reused is described. That is, the case where the PIN is not reused indicates a case where the manual PIN input timing 701 in FIG. 7 is set as the "manual PIN input only once". If the user manually inputs the PIN once such as in the initial login operation, the user is not, in principle, required to input the PIN again until the logout operation is performed. However, if an electronic signature needs to be obtained from the IC card 10, the IC card control section 204 requests the user to reenter the PIN to carry out PIN authentication. FIGS. 10A and 10B are each a sequence diagram illustrating a process without reuse of the PIN. The process without reuse of the PIN is described with reference to FIGS. 10A and 10B.

First, the application that requires the electronic signature requests the user to provide electronic signature information via the IC application 201. The IC card application 201 displays an electronic signature request prompt on the display device 11b such as "set IC card to obtain an electronic signature" (S1001).

When the user holds the IC card 10 over the IC card reader 18 (S1002), the IC card interface 202 detects the IC card 10 and retrieves the card ID from the IC card 10 (S1003) to transmit the card ID to the IC card control section 204. Since the IC card used in this example is the same IC card used in the aforementioned login operation, "0845c021f058c1a" is retrieved as the card ID.

The IC card control section 204 reads the electronic signature from the IC card 10 via the IC card interface 202 (S1004). However, the IC card interface 202 requests the PIN (security information) necessary for the PIN authentication in order to have access to the electronic signature (S1005).

Since the manual PIN input timing is set as the "manual PIN input if an electronic signature is required", the IC card control section 204 requests the IC card application 201 to supply the PIN without searching for the PIN (or without reusing the PIN) (S1006).

When the PIN request is transmitted to the IC card application 201, the IC card application 201 displays a PIN input request prompt on the display device 11b (S1007). For example, the IC card application 201 displays the PIN input request prompt on the display device 11b such as "Input your PIN".

When the user inputs his or her PIN such as "9999" (S1008), the input PIN information is transmitted to the IC card control section 204 (S1009). The IC card control section 204 reads the electronic signature information from the IC card 10 again based on the received PIN information (S1010).

Since the IC card interface 202 receives the effective PIN, the IC card interface 202 transmits the electronic signature information obtained from the IC card 10 to the IC card control section 204 (S1011). The IC card control section 204 requests the authentication section 205 to allow the user to have access to the application that requires the electronic signature based on the obtained electronic signature information (S1012).

The authentication section 205 authenticates the user to have access to the application that requires the electronic signature (S1013), and transmits the authentication result to the application that has required the electronic signature (S1014). If the authentication result is successful, the user can have access to the application that has required the electronic signature. Note that the image forming apparatus 1 according to the embodiment that is configured to implement the method for authenticating the electronic signature carried out by the authentication section 205 in order for the user to have access to the application that requires the electronic signature is only an example. However, alternatively, the image forming apparatus 1 according to the embodiment may be configured such that the application that requires the electronic signature includes an authentication function to authenticate the electronic signature based on the electronic signature information.

So far, the case where the PIN is not reused is described. That is, despite the fact that the PIN can be reused, the image forming apparatus 1 requests the user to manually input the PIN for PIN authentication without reusing the PIN under a certain condition. Accordingly, if the user desires to have access to highly-confidential documents or highly-confidential applications of the image forming apparatus 1, the image forming apparatus 1 is capable of maintaining a certain security level based on the security policy by constantly requesting the user to manually input the PIN.

(4) Logout Process

The user can log out from the image forming apparatus using the IC card 10. FIGS. 11A and 11B are each a sequence diagram illustrating a logout process using an IC card. The logout process using the IC card is described with reference to FIGS. 11A and 11B.

The IC card application 201 displays a message on the display device 11b such as "Ready to photocopy" (Step S1101). The screen of the display device is in a standby mode that waits for a next operation by the user.

As a logout operation, the user touches or presses a logout key (S1102) via a touch panel of the operations panel 11 or a keyboard (input device 11a), and the IC card application 201 displays an IC card setting prompt to the user (Step S1103). For example, the IC card application 201 displays the IC card setting prompt on the display device 11b such as "Set your IC card to log you out".

When the user holds the IC card 10 over the IC card reader 18 (S1104), the IC card interface 202 detects the IC card 10 and retrieves the card ID from the IC card 10 (S1105) to transmit the card ID to the IC card control section 204. Since the IC card used in this example is the same IC card used in the aforementioned login operation, "0845c021f058c1a" is retrieved as the card ID. The IC card control section 204 stores the "card ID" to be associated with the "user ID" in the login process in order to simplify the logout process. Accordingly, the user who desires to be logged out can be specified by the "card ID" alone. Alternatively, the user who desires to be logged out may be specified by reading the information on the user ID from the IC card 10 again.

The IC card control section 204 requests the authentication section 205 to log the user out based on the user ID (e.g., user 001) corresponding to the card ID held over the IC card reader 8 by the user (S1106).

The authentication section 205 performs the logout process (S1107) and transmits a logout notification to the IC card application 201 (S1108). On receiving the logout notification, the IC card application 201 displays a login prompt on the display device 11b such as "Log in to the image forming apparatus 1" (S1109). On receiving the logout notification, the IC card control section 204 transmits the logout notification to the PIN reuse manager 203 and the IC card interface 202 (S1110 and S1111).

When transmitting the logout notification to the PIN reuse manager 203, the IC card control section 204 requests the PIN reuse manager 203 to delete the stored PIN based on the card ID information (S1110).

On receiving the request for deleting the stored PIN, the PIN reuse manager 203 deletes the stored PIN (S1112). This step involves a process in which the stored PIN corresponding to the card information "0845c021fc058c1a" is deleted. Since the user (e.g., user 0001) performs the logout operation to end his or her operation of the image forming apparatus 1, the stored PIN is deleted to maintain the security level. Finally, the IC card control section 204 ends the control related to the IC card (S1113).

So far, the logout process is described. As described above, the leakage of the PIN or PIN theft may be prevented by deleting the stored PIN of the IC card 10 that has been used by the login user during the logout process.

Note that the logout process can be carried out without using the IC card. For example, the user may be logged out by operating the keys on the operations panel 11. In this case, the stored PIN corresponding to the user ID who desires to be logged out can be deleted during the logout process. Further, if no operation is performed after a prescribed time, the user may automatically be logged out by time out. In this case, the stored PIN corresponding to the user ID who desires to be logged out can be deleted during the logout process.

(5) Stored PIN Deleting Process

The stored PIN deleting process (S1112) is described in more detail. The PIN reuse manager 203 monitors (manages) the stored PIN information illustrated in FIG. 5, and deletes the stored PIN at a prescribed timing (deleting section). The "prescribed timing" indicates, as described earlier, when the stored PIN has been reused the prescribed number of times, when the prescribed time has elapsed, and when the user is logged out.

The case where the stored PIN is deleted when the number of times the PIN has been reused may exceed the prescribed number of times is described above in the description of the PIN search process (see FIG. 9). In the PIN search process, a PIN corresponding to the card ID (corresponding PIN) is searched for in order to reuse the corresponding PIN. If the corresponding PIN is found (i.e., if PIN is reused), the count for the number of times the PIN may be reused (remainder) is decremented by one (S905). Thereafter, the PIN reuse manager 203 determines whether the count for the number of times the PIN may be reused (remainder) is zero (S906). If the count for the number of times the PIN may be reused (remainder) is zero, indicating the obtained count equals or may exceed the prescribed number of times the PIN is to be reused, the PIN reuse manager 203 deletes the corresponding stored PIN (S907).

Figure 12:
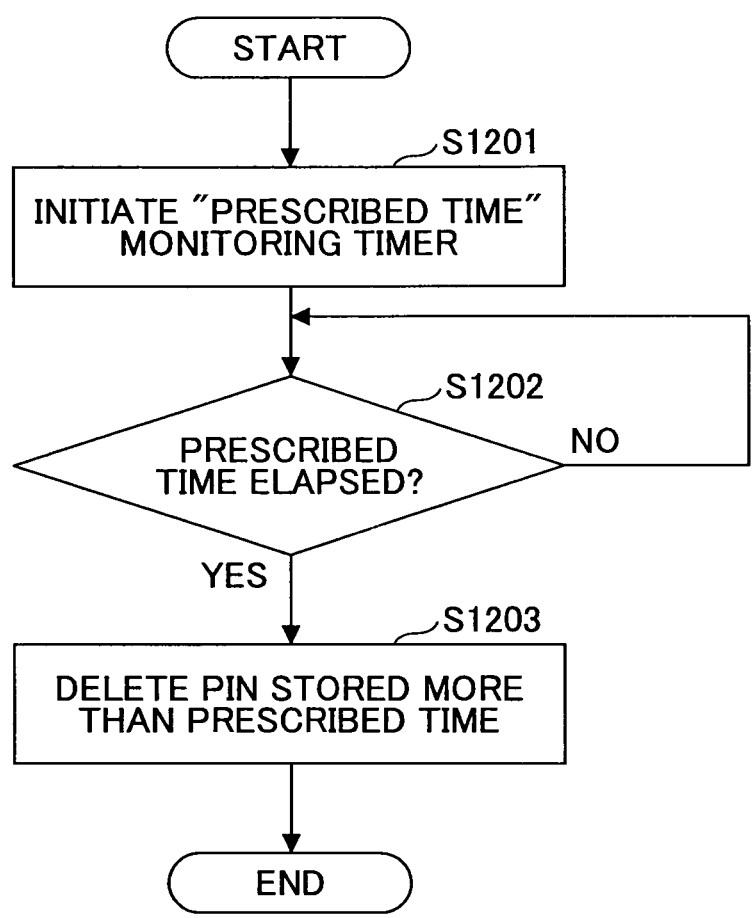
FIG. 12 is a flowchart illustrating a stored PIN deleting process after a prescribed time.

Next, the case is described where the stored PIN is deleted when the prescribe time has elapsed since the PIN has been stored. FIG. 12 is a flowchart illustrating the PIN deleting process in a case where the prescribed time has elapsed. In a case where the "stored PIN deleting timing" 702 is set as "after the prescribed time has elapsed", the PIN reuse manager 203 initiates a "prescribed time" monitoring timer at the time the PIN storage process (see FIG. 6) is completed (S1201). The prescribed time monitoring timer is provided to count the prescribed time. The PIN reuse manager 203 monitors whether the "prescribed time" has elapsed (S1202). If the "prescribed time" has elapsed since the PIN has been stored, the stored PIN that has been stored more than the prescribed time is deleted (S1203). Specifically, the PIN information illustrated in FIG. 5 is deleted from the storage device together with the card ID information.

Next, the case where the stored PIN is deleted when the user is logged out is described. The PIN reuse manager 203 deletes the stored PIN corresponding to the card ID of the IC card held by the user (ID) who has been logged out (S1112 of FIGS. 11A and 11B). Note that a PIN is not deleted if it is not stored because the PIN has been deleted before the user has been logged out or because the user has been logged in without using the IC card.

The stored PIN is deleted in order to prevent the leakage of the PIN information. Specifically, the cumbersome PIN input operation by the user is eliminated by reusing the stored PIN; however, permanently storing the PIN is not desirable in view of security. Accordingly, the PIN is only reused under a prescribed condition; otherwise the stored PIN is deleted. Note that the stored PIN deleting timing may also include a case where the image forming apparatus 1 is connected to the network, and a case where a denial-of-service attack or DOS attack is made. The PIN information is deleted in both cases to prevent the leakage of the PIN information.

<Modification>

The embodiment described above is a case where the user performs the login operation using the IC card. In the following modification, operations of the image forming apparatus 1 when the user performs the login operation by manual operation (e.g., with operations panel) is described. In a case where the user manually logs into the image forming apparatus 1 without IC card, the PIN information corresponding to the IC card is not stored (obtained). However, if the PIN is input to the image forming apparatus 1 by allowing the user to have access once to the application that requires the validation of the IC card while the user is in a login mode, the corresponding PIN is stored in the storage device. Thereafter, the corresponding PIN is reused.

Figure 13A:
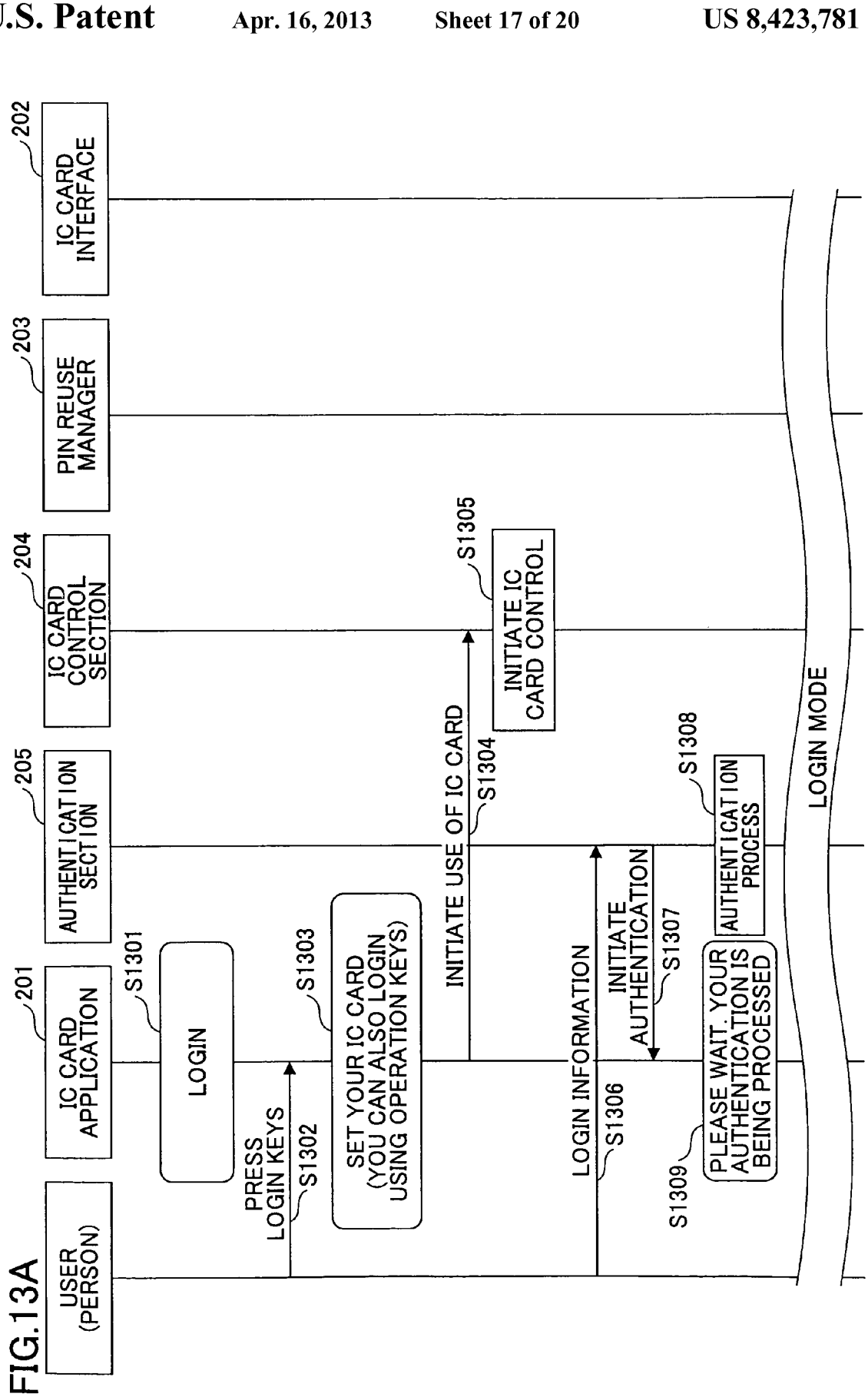

FIGS. 13A and 13B are each a sequence diagram illustrating a manual login process. Note that in the following modification, duplicated descriptions of the above may either be omitted from or simplified.

In the following modification, the operations of the IC card control section 204 and PIN reuse manager 203 are performed provided that the "manual PIN input timing 701 in FIG. 7 is set as the "manual PIN input only once". It is assumed that the "stored PIN deleting timing" 702 is set neither as "after the prescribed number of times PIN is reused" nor as "after the prescribed time has elapsed" for simplifying the following description.

The IC card application 201 displays a login prompt on the display device 11b such as "Log in to the image forming apparatus 1" (Step S1301).

When the user presses the login key (S1302), the IC card application 201 displays a message to prompt the user to carry out the login operation (S1303). For example, the IC card application 201 displays a message on the display device 11b such as "Set your IC card. (You can also log in using the operations keys)". The IC card application 201 also notifies the IC card control section 204 of initiation of the IC card use (S1304) in order for the IC card control section 204 to initiate controlling functions related to the IC card 10 (S1305).

In the image forming apparatus 1 according to this modification, the user can log in to the image forming apparatus 1 using the operations keys, and hence the user inputs the login information (e.g., user ID "user 001" and password "9999") by operating keys on the touch panel 11 or keyboard (hardware) without using the IC card 10 (S1306).

On receiving the login information, the authentication section 205 initiates the authentication process (S1308). The authentication process is performed based on whether the user ID and password combination matches the registered user ID and password combination already stored in the DB. In the authentication process, when the authentication section 205 notifies the IC card application 201 of the authentication initiation (S1307), the IC card application 201 displays, for example, "Please wait. Your authentication is being processed." (Step S1309).

The authentication section 205 authorizes the user to log in to the image forming apparatus 1 if the authentication is successful, and transmits the IC card application 201 and the IC card control section 204 a login notification (S1310). The login notification is transmitted to the reuse PIN manager 203 and the IC card interface 202 via the IC card control section 204. The successful login authentication is communicated to the user by displaying a message on the display device 11b such as "Ready to photocopy" (S1313). If the log-in authentication has failed (S1311), the user is notified of the login failure by displaying a message such as "Login has failed" (S1312).

The longin process with a manual operation has been described so far. In the description above, the IC card is not used and the PIN is thus not stored.

Figure 14A:
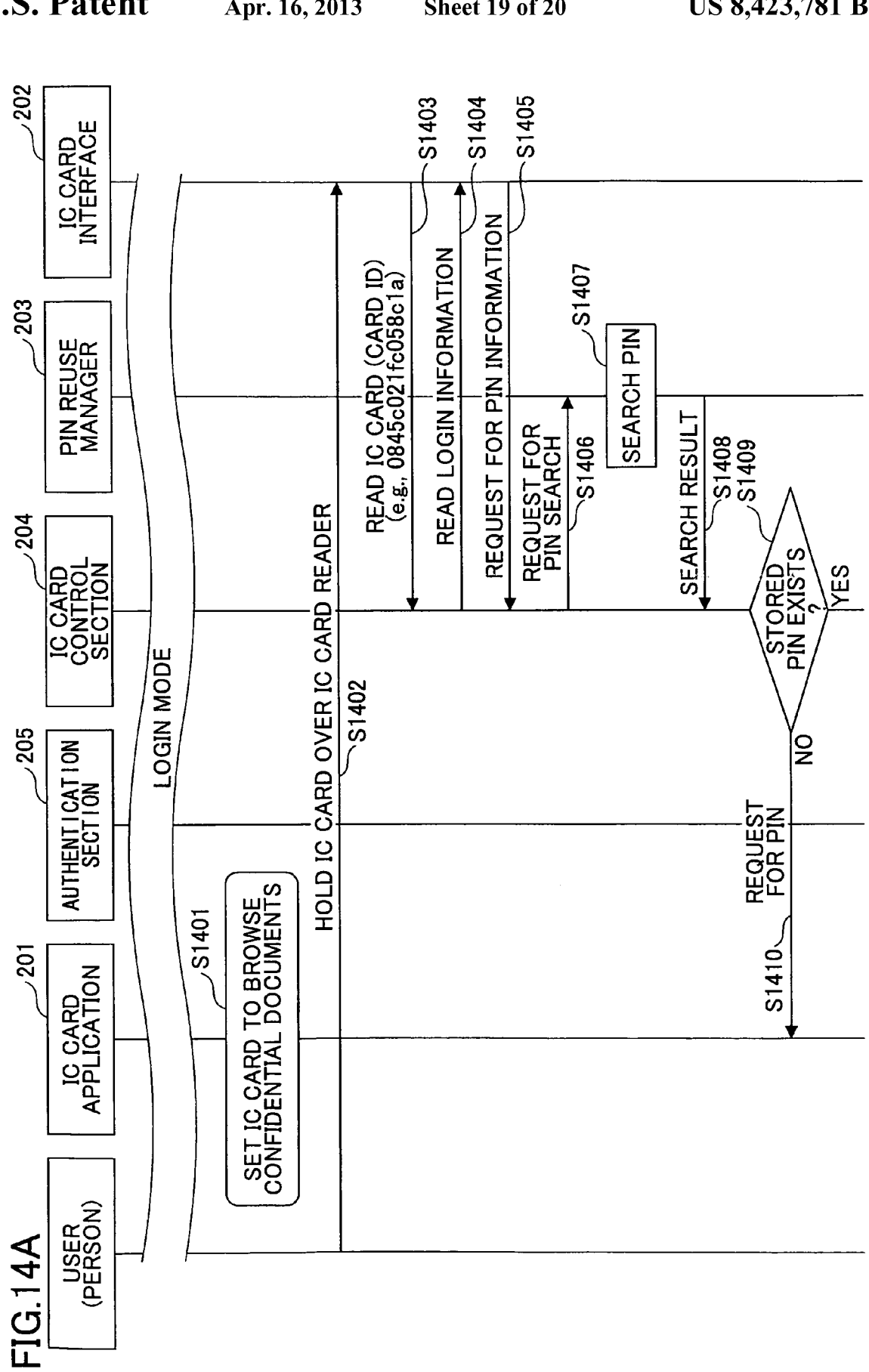

FIGS. 14A and 14B are each a sequence diagram illustrating a PIN storage process after the user has manually logged in. Further details of the modification are described below.

After the user manually logs in to the image forming apparatus 1 and desires to have access to the application that requires the validation of the IC card holder, the application displays an IC card setting prompt to the user via the IC card application 210 to prompt the user to set an IC card (S1401). For example, the IC card application 201 displays the IC card setting prompt on the display device 11b such as "Set your IC card to browse confidential documents".

When the user holds the IC card 10 over the IC card reader 18 (S1902), the IC card interface 202 detects the IC card 10 and retrieves the card ID from the IC card 10 (S1403) to transmit the card ID to the IC card control section 204. In this example, "0845c021f058c1a" is retrieved as the card ID that is used for the first time.

The IC card control section 204 reads the login information from the IC card 10 via the IC card interface 202 (S1404). However, the IC card interface 202 requests a PIN (security information) necessary for the PIN authentication in order to have access to the login information (S1405).

When the PIN request is transmitted to the IC card control section 204, the IC card control section 204 transmits a PIN search request to the PIN reuse manager 203 (S1406). The PIN reuse manager 203 searches for the PIN corresponding to the card ID based on information on the card ID as a search key (S1407). Thereafter, the PIN reuse manager 203 transmits a search result to the IC card control section 204 as a response to the search request (S1408). The search result, in this case, is "No corresponding PIN is found". In the process above, the IC card has not been in use and the PIN is thus not stored by the PIN reuse manager 203.

In a case there is no stored PIN (S1409) and the IC card control section 205 transmits a request for the PIN to the IC card application 201 (S1410), the IC card application 201 displays a PIN input request prompt on the display device 11b (S1411). For example, the IC card application 201 displays the PIN input request prompt on the display device 11b such as "Input your PIN".

When the user inputs his or her PIN such as "9999" (S1412), the input PIN information is transmitted to the IC card control section 204 (S1413). The IC card control section 204 reads the login information (i.e., user ID and password combination) from the IC card 10 again based on the received PIN information (S414).

Since the IC card interface 202 receives the effective PIN, the IC card interface 202 transmits the login information obtained from the IC card 10 to the IC card control section 204 (S1415). The IC card control section 204 requests the authentication section 205 to allow the user to log in based on the obtained login information (S1416).

The authentication section 205 authenticates the user to log in (S1417) while verifying the login user, namely, login user ID (user 001) and transmits the authentication result to the application that has required the validation of the IC card 10 (S1418). If the authentication result is successful, the user can browse the highly-confidential documents as a service provided by the application. The authentication section 205 also transmits, if the authentication result is successful, the successful authentication to the IC card control section 204 (S1419).

Further, if the authentication result is successful, the IC card control section 204 requests the reuse PIN manager 203 to store the card ID and PIN (S1420). On receiving the request, the reuse PIN manager 203 stores the card ID and PIN (S1421). Specifically, the information stored in this step (S1421) includes "0845c021fc058c1a" as the card ID and "9999" as the PIN. Accordingly, the same PIN can be reused until the user is logged out to thereby delete the PIN from the storage device. That is, in a case where the user desires to have access to the application again that requires the validation of the IC card holder or the electronic signature, the user simply holds the IC card over the IC card reader without reentering the PIN. Thus, the cumbersome PIN reentering operation (reentering of the PIN) by the user can be eliminated.

As described above, in the image forming apparatus 1 according to the modification, the PIN storage timing is not limited to the time at which the user performs the login operation, and the PIN may be obtained and stored at the time the user inputs the PIN. However, it is preferable that the PIN be stored while the user is a login mode (i.e., duration between login and logout) in view of security.

<Overview>

In the image forming apparatus according to the embodiments, if the user has succeeded once in the PIN authentication using his or her IC card, information on the PIN corresponding to the IC card is stored so that the user can reuse the corresponding PIN when it is required for the second time onward. As a result, the cumbersome operation of reentering the PIN can be eliminated. In addition, since the image forming apparatus according to the embodiments is configured to set a rule for storing the PIN without the leakage of the PIN, the administrator can flexibly manage users of the image forming apparatus based on the security policy.

That is, the embodiments of the present invention may provide an image forming apparatus, a method for validating an IC card holder, and a computer program product for executing such a method capable of exhibiting, based on an input policy of PIN information, improved usability and operability of an IC card that requires a PIN authentication with enhanced security.

The embodiments of the invention described so far are not limited thereto. Various modifications and alteration may be made within the scope of the invention as described in the claims.

Note that any arbitrary combinations, expressions, or rearrangement, as appropriate, of the aforementioned constituting elements and so forth applied to a method, device, system, computer program, recording medium, and the like are all effective as and encompassed by the embodiments and modifications of the present invention.

The embodiments of the present invention may provide an image forming apparatus, a method for validating an IC card holder, and a computer program product for executing such a method capable of exhibiting, based on an input policy of PIN information, improved usability and operability of IC card that requires a PIN authentication with enhanced security.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2009-030067 filed on Feb. 12, 2009, the entire contents of which are hereby incorporated herein by reference.

What is claimed is:

1. An image forming apparatus comprising:
a validating unit configured to validate a holder of an IC card having a first security information set, a login information set, and a first identifier information set corresponding to the first security information set, based on the first security information set;

a login unit configured to perform a login process for the holder of the IC card to log in based on the login information set stored in the IC card; and a storage unit configured to store the first security information set of the IC card as a second security information set and the first identifier information set corresponding to the first security information set of the IC card as a second identifier information set that are obtained by the validating unit when the login process that is performed, after the holder of the IC card has been validated by the validating unit, by the login unit using the IC card is successful, wherein the validating unit validates, provided that the first identifier information set obtained from the IC card matches the second identifier information set corresponding to the second security information set of the IC card stored in the storage unit, the holder of the IC card by reusing the second security information set corresponding to the second identifier information set of the IC card stored in the storage unit when the first security information set is, after the login process has been performed, requested by using the IC card.

2. The image forming apparatus as claimed in claim 1, further comprising:

a logout unit configured to perform a logout process for the holder of the IC card to log out; and a deleting unit configured to delete, when the holder of the IC card has been logged out by the logout unit, the second security information set corresponding to the second identifier information set of the IC card stored in the storage unit.

3. The image forming apparatus as claimed in claim 2, wherein the deleting unit deletes, provided that one of a condition in which a number of times the second security information set is reused may exceed a prescribed number of times and a condition in which a prescribed time has elapsed since the second security information set has been stored in the storage unit is satisfied, the second security information set corresponding to the second identifier information set of the IC card stored in the storage unit.

4. The image forming apparatus as claimed in claim 1, wherein whether the second security information set corresponding to the second identifier information set of the IC card stored in the storage unit is to be reused can be set based on an application that requests the first security information set.

5. The image forming apparatus as claimed in claim 1, wherein the first identifier information set uniquely identifies the IC card.

6. An image forming apparatus comprising:

a validating unit configured to validate a holder of an IC card having a first security information set, a login information set and a first identifier information set corresponding to the first security information set, based on the first security information set;

a login unit configured to perform a login processes for the holder of the IC card to log in; and a storage unit configured to store the first security information set of the IC card as a second security information set and the first identifier information set corresponding to the first security information set of the IC card as a second identifier information set that are obtained by the validating unit when the holder of the IC card is, after the login process performed by the login unit using the IC card has been successful, validated by the validating unit, wherein the validating unit validates, provided that the first identifier information set obtained from the IC card matches the second identifier information set corresponding to the second security information set of the IC card stored in the storage unit, the holder of the IC card by reusing the second security information set corresponding to the second identifier information set of the IC card stored in the storage unit when the first security information is requested by using the IC card.

7. The image forming apparatus as claimed in claim 6, further comprising:

a logout unit configured to perform a logout process for the holder of the IC card to log out; and a deleting unit configured to delete, when the holder of the IC card has been logged out by the logout unit, the second security information set corresponding to the second identifier information set of the IC card stored in the storage unit.

8. The image forming apparatus as claimed in claim 7, wherein the deleting unit deletes, provided that one of a condition in which a number of times the second security information set is reused may exceed a prescribed number of times and a condition in which a prescribed time has elapsed since the second security information set has been stored in the storage unit is satisfied, the second security information set corresponding to the second identifier information set of the IC card stored in the storage unit.

9. The image forming apparatus as claimed in claim 6, wherein whether the second security information set corresponding to the second identifier information set of the IC card in the storage unit is to be reused can be set based on an application that requests the first security information set.

10. The image forming apparatus as claimed in claim 6, wherein the first identifier information set uniquely identifies the IC card.

11. A non-transitory computer-readable recording medium having a computer program for causing an image forming apparatus, which includes a validating unit configured to validate a holder of an IC card having a first security information set, a login information set, and a first identifier information set corresponding to the first security information set, based on the first security information set, and a login unit configured to perform a login process for the holder of the IC card to log in based on the login information set stored in the IC card, to execute a method for validating the holder of the IC card, the method comprising:

storing the first security information set of the IC card as a second security information set and the first identifier information set corresponding to the first security information set of the IC card as a second identifier information set that are obtained by the validating unit when the login process that is performed, after the holder of the IC card has been validated by the validating unit, by the login unit using the IC card is successful; and validating, provided that first identifier information set obtained from the IC card matches the second identifier information set corresponding to the second security information set of the IC card stored in the storage unit, the holder of the IC card by reusing the second security information set corresponding to the second identifier information set of the IC card stored in the storage unit when the first security information is, after the login process has been performed, requested by using the IC card.

* * * * *